United States Patent
Michel et al.

(10) Patent No.: US 10,592,934 B2
(45) Date of Patent: Mar. 17, 2020

(54) SYSTEMS AND METHODS FOR AUTOMATED MULTI-OBJECT DAMAGE ANALYSIS

(71) Applicant: The Travelers Indemnity Company, Hartford, CT (US)

(72) Inventors: Ian J. Michel, Coventry, CT (US); George Lee, North Franklin, CT (US); Pee T. Lim, Middletown, CT (US); John Han, Glastonbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 59 days.

(21) Appl. No.: 15/941,345

(22) Filed: Mar. 30, 2018

(65) Prior Publication Data
US 2019/0303982 A1 Oct. 3, 2019

(51) Int. Cl.
| | | |
|---|---|---|
| *G06Q 30/02* | (2012.01) | |
| *G05D 1/04* | (2006.01) | |
| *B64C 39/02* | (2006.01) | |
| *G06Q 40/08* | (2012.01) | |
| *G06N 5/02* | (2006.01) | |
| *G05D 1/00* | (2006.01) | |
| *H04N 7/18* | (2006.01) | |
| *G06K 9/00* | (2006.01) | |
| *G06K 9/32* | (2006.01) | |

(52) U.S. Cl.
CPC ....... *G06Q 30/0278* (2013.01); *B64C 39/024* (2013.01); *G05D 1/0094* (2013.01); *G05D 1/042* (2013.01); *G06K 9/00637* (2013.01); *G06K 9/3258* (2013.01); *G06N 5/022* (2013.01); *G06Q 40/08* (2013.01); *H04N 7/185* (2013.01); *B64C 2201/127* (2013.01); *G06K 2209/01* (2013.01)

(58) Field of Classification Search
CPC .... G06Q 30/0278; G06Q 40/08; G05D 1/042; G05D 1/0094; G06N 5/022; H04N 7/185; G06K 2209/01; G06K 9/00637; G06K 9/3258; B64C 2201/127; B64C 39/024
See application file for complete search history.

(56) References Cited

U.S. PATENT DOCUMENTS 9,805,261 B1\* 10/2017 Loveland ........... G06K 9/00637
2018/0292374 A1\* 10/2018 Dittberner ............ G05D 1/0094

\* cited by examiner

*Primary Examiner* — Joseph W Becker
(74) *Attorney, Agent, or Firm* — Fincham Downs LLC; Carson C. K. Fincham

(57) ABSTRACT

Systems and methods for automatically ascertaining an estimated amount of damage to a plurality of objects at a location by utilizing one or more Unmanned Aerial Vehicle (UAV), e.g., "drone" devices to capture imagery of the location and utilizing Artificial Intelligence (AI) logic modules to analyze the captured imagery.

18 Claims, 14 Drawing Sheets

SYSTEMS AND METHODS FOR AUTOMATED MULTI-OBJECT DAMAGE ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Identification and analysis of damage to a plurality of discrete objects at a location, such as vehicles in a parking lot, are extremely time consuming and prone to various errors. Errors in such analysis often result in monetary losses for either or both of an owner of one of the objects (underpayment of an insurance claim) and an insurer or other underwriting entity (overpayment of an insurance claim). Delays in analyzing possible damage may themselves lead to losses, e.g., in the case of a car dealer having sustained a hailstorm at a new car lot, the damaged cars cannot likely be sold or repaired until the damage analysis is complete, leading at least to a delay in operational revenue for the car dealer.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Damage analysis for a plurality of objects is often highly labor intensive and prone to analysis errors. Time delays in acquiring and analyzing data are accentuated by an increase in the prevalence of insured locations having a plurality of discrete objects (such as vehicles in a parking lot) and an increase in high-risk weather (and other) events that cause damage at such locations. Previous attempts at decreasing the time delay of such analysis have generally concentrated on analysis of individual or discrete objects and have not addressed large-scale damage analysis events, such as the continuing and non-limiting example herein of a hailstorm at a car dealer's new inventory parking lot.

In accordance with embodiments herein, these and other deficiencies of previous efforts are remedied by providing systems, apparatus, methods, and articles of manufacture for automatically, quickly, and accurately ascertaining an estimated amount of damage to a plurality of objects at a location by utilizing one or more Unmanned Aerial Vehicle (UAV), e.g., "drone" devices to capture imagery of the location and utilizing Artificial Intelligence (AI) logic modules to analyze the captured imagery. In some embodiments, for example, a multi-object damage analysis system may employ a set of logical rules and/or procedures (such as one or more vehicle control and/or AI modules) that are specially-coded to (i) cause an aerial vehicle to capture bird's-eye view imagery of a location (e.g., at a first altitude), (ii) analyze (e.g., utilizing a first AI module) the bird's-eye view imagery to identify a number (and/or position) of discrete objects at the location, (iii) cause the aerial vehicle (or a second aerial vehicle) to capture close-up imagery of a subset of the discrete objects (e.g., at a second altitude), (iv) analyze (e.g., utilizing a second AI module) the close-up imagery to identify each discrete object (e.g., identify a make, model, and/or Vehicle Identification Number (VIN) for each vehicle in a parking area), (v) analyze (e.g., utilizing a third AI module) the close-up imagery and/or the bird's-eye view imagery to identify damage (or lack thereof) for each discrete object, (vi) calculate an estimated damage and/or repair amount for each discrete object (e.g., utilizing make, model, and/or Vehicle Identification Number (VIN) identifiers in conjunction with a repair cost estimation database), (vii) output a total estimated dollar amount of damage for the location, and/or (viii) calculate an insurance claim result based on the total estimated dollar amount of damage for the location and stored insurance policy parameters.

II. Automated Multi-Object Damage Analysis Systems

Figure 1:
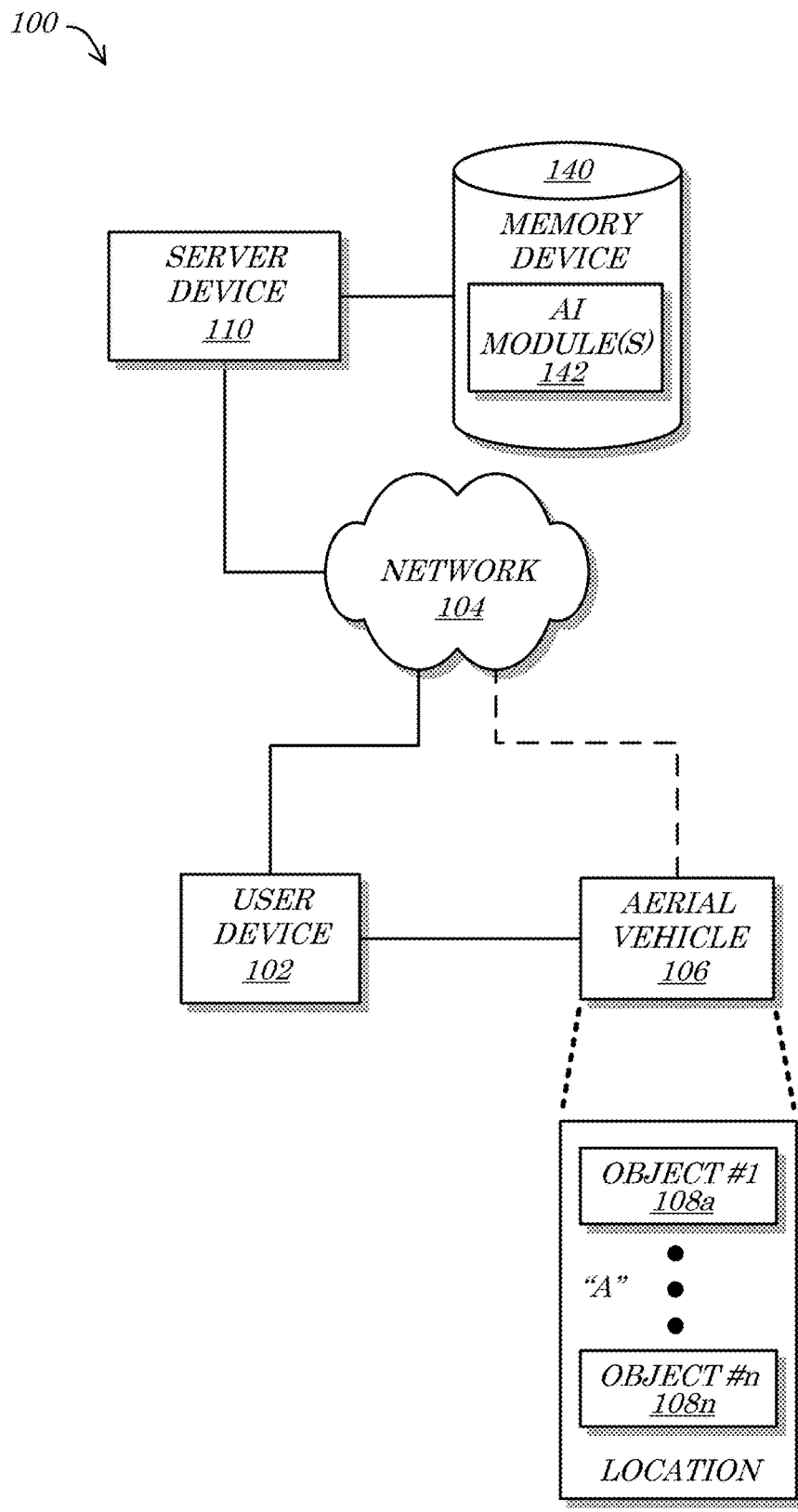
FIG. 1 is a block diagram of a system according to some embodiments.

Referring first to FIG. 1, a block diagram of a system 100 according to some embodiments is shown. In some embodiments, the system 100 may comprise a user device 102 communicatively coupled to a network 104. In some embodiments, the user device 102 and/or the network 104 may also or alternatively be coupled to an aerial vehicle 106 that is disposed to capture data descriptive of a plurality of discrete objects 108a-n, e.g., at a specific location "A". According to some embodiments, the user device 102 and/or the aerial vehicle 106 may be in communication with (e.g., via the network 104) one or more of a server device 110 and a memory device 140 (e.g., storing one or more AI modules 142). In accordance with various embodiments herein, the user device 102 may be utilized to direct, manage, and/or interface with the aerial vehicle 106 to capture imagery of the location "A" and the discrete objects 108a-n thereof. In some embodiments, the captured imagery may be provided from the aerial vehicle 106 to the user device 102 (and/or the server device 110) for imagery analysis and execution of stored analysis rules and/or logic (e.g., the AI module(s) 142). In such a manner, for example, errors and timeliness constraints that hinder current multi-object damage analysis procedures may be remedied.

Fewer or more components 102, 104, 106, 108a-n, 110, 140, 142 and/or various configurations of the depicted components 102, 104, 106, 108a-n, 110, 140, 142 may be included in the system 100 without deviating from the scope of embodiments described herein. In some embodiments, the components 102, 104, 106, 108*a-n*, 110, 140, 142 may be similar in configuration and/or functionality to similarly named and/or numbered components as described herein. In some embodiments, the system 100 (and/or portions thereof) may comprise an automatic, multi-object, damage analysis program, system, and/or platform programmed and/or otherwise configured to execute, conduct, and/or facilitate the method 400 of FIG. 4 herein, and/or portions thereof.

The user device 102, in some embodiments, may comprise any type or configuration of computing, mobile electronic, network, user, and/or communication device that is or becomes known or practicable. The user device 102 may, for example, comprise one or more tablet computers, such as an iPad® manufactured by Apple®, Inc. of Cupertino, Calif., and/or cellular and/or wireless telephones or "smart" phones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user device 102 may comprise one or more devices owned and/or operated by one or more users, such as an automobile insurance customer (and/or other vehicle, liability, personal, and/or business insurance customer), an owner of a business or fleet of vehicles (or other insured objects), and/or an insurance agent. According to some embodiments, the user device 102 may communicate with the server device 110 via the network 104 to provide imagery captured by the aerial vehicle 106 for damage analysis, as described herein. According to some embodiments, the user device 102 may store and/or execute specially programmed instructions (such as a mobile device application) to operate in accordance with embodiments described herein. The user device 102 may, for example, execute one or more mobile device programs that activate and/or control the aerial vehicle 106 and/or that analyze imagery of the location "A" and/or the discrete objects 108*a-n*, e.g., to calculate a total number of discrete objects 108*a-n* at the location "A", to identify types of discrete objects 108*a-n* (e.g., makes and models in the case of automobiles or other vehicles), to identify damage to the discrete objects 108*a-n*, and/or to estimate a monetary value of the damage to the discrete objects 108*a-n*.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the server device 110, the user device 102, the aerial vehicle 106, and/or the memory device 140. In some embodiments, the network 104 may comprise direct communications links between any or all of the components 102, 106, 110, 140 of the system 100. The user device 102 may, for example, be directly interfaced or connected to one or more of the aerial vehicle 106 and/or the server device 110 via one or more wires, cables, wireless links, and/or other network components, such network components (e.g., communication links) comprising portions of the network 104. In some embodiments, the network 104 may comprise one or many other links or network components other than those depicted in FIG. 1. The user device 102 may, for example, be connected to the server device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 106, 110, 140 of the system 100. The network 104 may comprise one or more cellular telephone networks with communication links between the user device 102, the aerial vehicle 106, and the server device 110, for example, and/or may comprise a BLE, NFC, RF, and/or "personal" network comprising short-range wireless communications between the user device 102 and the aerial vehicle 106, for example.

The aerial vehicle 106, in some embodiments, may comprise any type or configuration of vehicle, device, and/or object that is capable of capturing imagery of the specific location "A". The aerial vehicle 106 may comprise, for example, one or more drones, UAV devices, remote-controlled aircraft, rigid and/or inflatable airships, satellites, rockets, payload delivery systems and/or payload guidance systems. According to some embodiments, the aerial vehicle 106 may comprise one or more commercial drones, such as one or more DJI Phantom 3 Pro drones with a twelve (12)-megapixel camera, available from Dà-Jiāng Innovations Science and Technology Co., Ltd ("DJI") of Shenzhen, China. In some embodiments, the aerial vehicle 106 may comprise a plurality of cooperative vehicles and/or devices (not separately shown in FIG. 1), such as a first aerial vehicle 106 tasked with capturing high-altitude or bird's-eye imagery at a first altitude/distance (e.g., greater than one hundred feet (100 ft; thirty and one half meters (30.5 m)) and a second aerial vehicle 106 tasked with capturing low-altitude or close-up imagery at a second altitude/distance (e.g., less than thirty feet (30 ft; nine and one tenth meters (9.1 m)). The imagery captured by the aerial vehicle 106 may generally comprise any type, quantity, and/or format of photographic, video, and/or other sensor data descriptive of a layout of the location "A" (e.g., at least relative locations of the discrete objects 108*a-n* at the location "A").

According to some embodiments, the discrete objects 108*a-n* may comprise any number of multiple objects for which identification and/or damage information is desired. In accordance with the continuing and non-limiting example herein, for example, the location "A" may comprise a car dealer's new inventory parking lot at which the discrete objects 108*a-n* comprise different vehicles parked at the parking lot. In some embodiments, such as in the case that an AI module is utilized to analyze bird's-eye imagery to calculate or compute a total number of discrete objects 108*a-n* at the location "A", the discrete objects 108*a-n* may comprise any objects that may be separately identifiable and/or distinguishable by the AI module. Examples of the discrete objects 108*a-n* may include, but are not limited to, houses in a community, boats in a marina and/or drydock, train cars in a railyard, beehives at a farm, trees in an orchard, and stacks of materials in a stockyard. In each case, for example, the aerial vehicle 106 may be deployed to an altitude (e.g., a first altitude) above the discrete objects 108*a-n* such that all discrete objects 108*a-n* at the location "A" (and/or marked or identifiable boundaries of the location "A") are visible within a field of view of an imaging device (not shown) of the aerial vehicle 106 and "bird's-eye" (e.g., overhead, plan-view) imagery of the discrete objects 108*a-n* may be captured. The AI module may then analyze the imagery to distinguish between the various discrete objects 108a-n at the location "A" and compute or calculate a total number of discrete objects 108a-n at the location "A".

In some embodiments, the server device 110 may comprise an electronic and/or computerized controller device, such as a computer server and/or server cluster communicatively coupled to interface with the user device 102 and/or the aerial vehicle 106 (directly and/or indirectly). The server device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the server device 110 may be located remotely from one or more of the user device 102 and the aerial vehicle 106. The server device 110 may also or alternatively comprise a plurality of electronic processing devices located at one or more various sites and/or locations (e.g., a distributed computing and/or processing network).

According to some embodiments, the server device 110 may store and/or execute specially-programmed instructions to operate in accordance with embodiments described herein. The server device 110 may, for example, execute one or more programs that facilitate and/or cause the automatic detection, verification, data capture, and/or data analysis of a damage event, multi-object, and/or location, as described herein. According to some embodiments, the server device 110 may comprise a computerized processing device, such as a PC, laptop computer, computer server, and/or other network or electronic device, operated to manage and/or facilitate automatic multi-object damage analysis in accordance with embodiments described herein.

In some embodiments, the server device 110, the user device 102, and/or the aerial vehicle 106 may be in communication with the memory device 140. The memory device 140 may store, for example, mobile device application data, discrete object data, insurance policy data, damage estimation data, location data (such as coordinates, distances, etc.), security access protocol and/or verification data, and/or instructions that cause various devices (e.g., the server device 110, the user device 102, and/or the aerial vehicle 106) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store vehicle identifier data, device identifier data, location data, AI module(s), image analysis data, flight plan data, and/or damage estimation data provided by (and/or requested by) the user device 102 and/or the server device 110, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, Calif.). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the user device 102, the aerial vehicle 106, and/or the server device 110 may comprise the memory device 140 or a portion thereof, for example.

Figure 2:
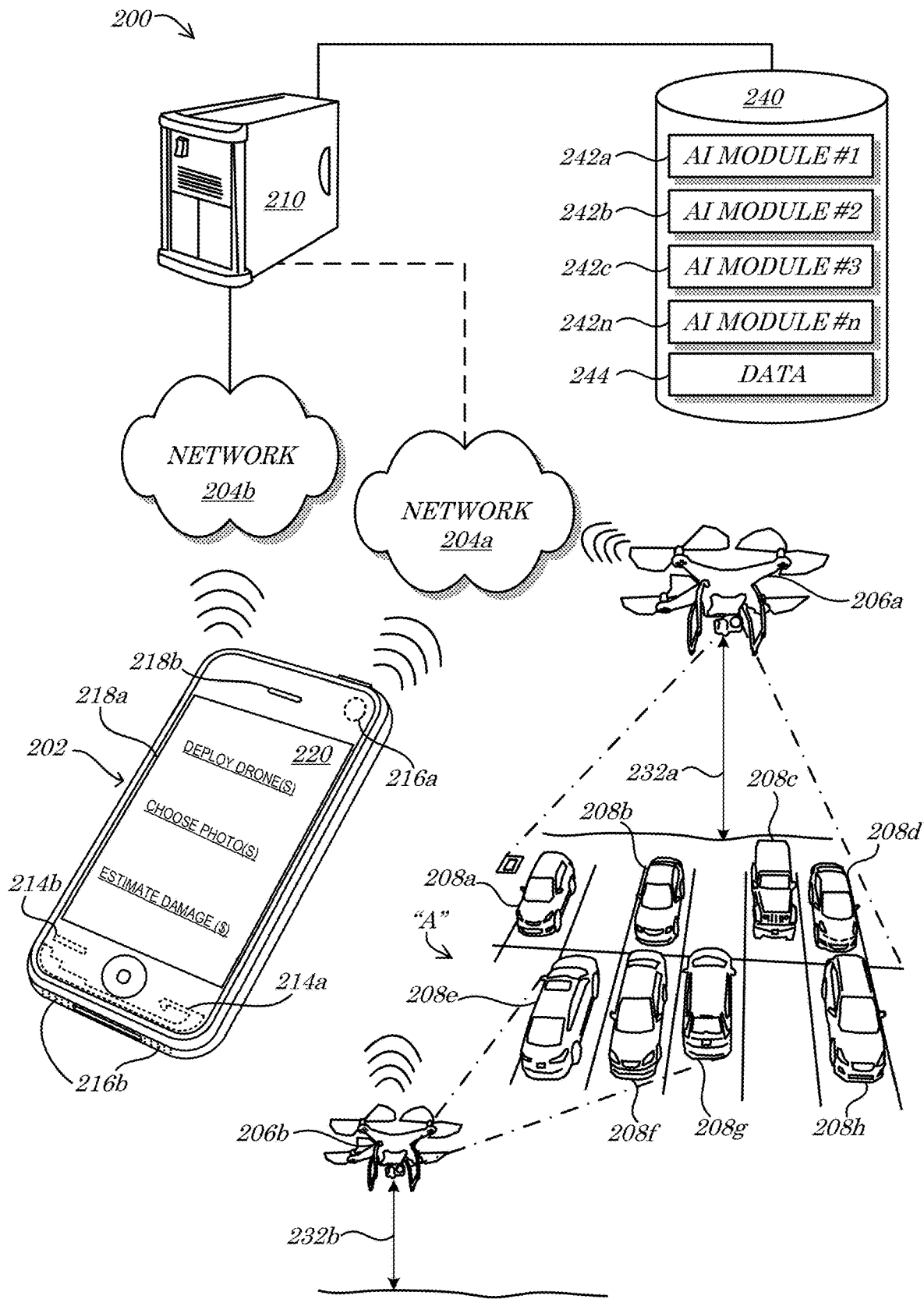
FIG. 2 is a perspective diagram of a system according to some embodiments.

Turning to FIG. 2, a perspective diagram of system 200, according to some embodiments, is shown. In some embodiments, the system 200 may comprise a mobile electronic device 202 in communication via (i) a first wireless network 204a and/or (ii) a second wireless network 204b, with a first drone 206a and/or a second drone 206b. In some embodiments, the drones 206a-b may be disposed to capture imagery (and/or other data) descriptive of a location "A" comprising a plurality of discrete objects 208a-h. Each discrete object 208a-h may comprise, for example, a vehicle parked in a parking lot of (or comprising) location "A". According to some embodiments, the mobile electronic device 202 may also or alternatively be in communication with a server 210 (e.g., via the second wireless network 204b, as depicted). In some embodiments, the mobile electronic device 202 may comprise one or more communication antenna 214a-b (e.g., a first antenna 214a such as a cellular network or long-range antenna and/or a second antenna 214b such as a Wi-Fi®, Bluetooth®, and/or other short-range communications antenna), input devices 216a-b (e.g., a first input device 216a, such as a camera and/or a second input device 216b, such as a microphone), and/or output devices 218a-b (e.g., a first output device 218a, such as a display screen, and/or a second output device 218b, such as a speaker). According to some embodiments, the mobile electronic device 202 (and/or the display screen 218a thereof) may output a Graphical User Interface (GUI) 220 that provides output from and/or accepts input for, a mobile device application executed by the mobile electronic device 202.

In some embodiments, the mobile electronic device 202 may execute the mobile device application to conduct communications with and/or control one or more of the drones 206a-b. The mobile electronic device 202 may, for example, transmit a signal (e.g., via the first wireless network 204a and/or utilizing the second antenna 214b) to the first drone 206a that causes the first drone 206a to fly above the location "A" (e.g., to a first altitude 232a) and capture first imagery thereof. The first drone 206a may acquire "bird's-eye", e.g., overhead imagery, for example, that provides image data descriptive of a view of the location "A" from above. In some embodiments, the first drone 206a may be positioned to capture the first imagery such that any boundaries (natural and/or flagged) of the location "A" fit within a field of view of a camera device (not separately labeled) of the first drone 206a. According to some embodiments, the mobile electronic device 202 may direct the first drone 206a by providing target coordinates or directions descriptive of the location "A" (e.g., a mailing address and/or latitude and longitude coordinates), by defining and/or choosing a flight plan, and/or by defining and sending control signals that affect the speed, pitch, direction, etc., of the first drone 206a. In response to transmissions from the mobile electronic device 202, for example, the first drone 206a may activate one or more propulsion and/or flight control devices (not separately labeled) to move the first drone 206a to the location "A" and/or to a specific location above the location "A" (e.g., to the first altitude 232a). In such a manner, for example, the first drone 206a may capture imagery that includes overhead visual (and/or other) representations of each of the discrete objects 208a-h (e.g., vehicles, as depicted in the example of FIG. 2).

According to some embodiments, the mobile electronic device 202 may also or alternatively execute the mobile device application to conduct communications with and/or control the second drone 206b. The mobile electronic device 202 may, for example, transmit a signal (e.g., via the first wireless network 204a and/or utilizing the second antenna 214b) to the second drone 206b that causes the second drone 206b to fly to (and/or around) the location "A" (e.g., to or at a second altitude 232b) and capture second imagery thereof. The second drone 206b may acquire "close up", zoomed-in, or perspective view imagery, for example, that provides image data descriptive of one or more subsets of the discrete objects 208a-h. In some embodiments, the second drone 206b may be positioned to capture the second imagery such that any boundaries (natural and/or flagged) of a first subset of the discrete objects 208a-h fit within a field of view of a camera device (not separately labeled) of the second drone 206b. According to some embodiments, the mobile electronic device 202 may direct the second drone 206b by providing target coordinates or directions descriptive of the location "A" (e.g., a mailing address and/or latitude and longitude coordinates), by defining and/or choosing a flight plan (e.g., based on the first imagery captured by the first drone 206a and/or an analysis thereof), and/or by defining and sending control signals that affect the speed, pitch, direction, etc., of the second drone 206b. In response to transmissions from the mobile electronic device 202, for example, the second drone 206b may activate one or more propulsion and/or flight control devices (not separately labeled) to move the second drone 206b to an area of the location "A" and/or to a specific sub-location at the location "A", and/or to achieve a specific orientation (e.g., camera field of view orientation) or second altitude 232b. In such a manner, for example, the second drone 206b may capture imagery that includes close-up visual (and/or other) representations of at least a first subset of the discrete objects 208a-h (e.g., fifth, sixth, and seventh discrete objects 208e-g, as depicted in FIG. 2). While the second drone 206b is depicted as being utilized to capture the close-up imagery of the first subset of the discrete objects 208a-h in FIG. 2, according to some embodiments, the first drone 206a may capture both the first and second imagery, or fewer or more drones 206a-b may be utilized as is or becomes known or practicable. While drones 206a-b are depicted for convenience of illustration, other aerial (and/or spaceborne) vehicles may be utilized in accordance with some embodiments.

In some embodiments, any or all imagery captured, recorded, and/or sensed at, near, and/or otherwise descriptive of the location "A" and/or the discrete objects 208a-h thereof, may be transmitted, processed, and/or analyzed. The imagery may be transmitted from either respective drone 206a-b to the mobile electronic device 202 (e.g., via the first wireless network 204a), for example, and the mobile device application executed by the mobile electronic device 202 may implement stored rules and/or logic to analyze the received imagery. According to some embodiments, the mobile electronic device 202 may forward received imagery data to the server 210 (e.g., via the second wireless network 204b) and/or may conduct an analysis of at least a portion of the imagery data captured by the drones 206a-b. In some embodiments, the drones 206a-b may transmit captured imagery (and/or other data) directly to the server 210.

According to some embodiments, the server 210 (and/or the mobile electronic device 202) may execute and/or call imagery analysis instructions stored in a memory device 240. While the memory device 240 is depicted as being in communication with the server 210, the memory device 240 may comprise one or more data storage devices and/or objects disposed in and/or accessible by any or all of the server 210, the mobile electronic device 202, the first drone 206a, and/or the second drone 206b. According to some embodiments, the memory device 240 may store and/or define a plurality of AI modules 242a-n. In some embodiments, imagery data received from the drones 208a-b, vehicle (and/or other object) identification data, damage identification data, damage cost (e.g., repair/replacement cost) data, and/or insurance data may be stored as data 244 in the memory device 240. According to some embodiments, the AI modules 242a-n may act upon or process the data 244 to conduct an analysis of the imagery provided by the drones 206a-b. A first one of the AI modules 242a may, for example, comprise and/or define AI programming logic that is directed to taking the first imagery data (e.g., bird's-eye/overhead imagery) as input, analyzing imagery features (e.g., lines, shadows, distances, colors, shapes) to identify boundaries defining the discrete objects 208a-h, and outputting a total number of the discrete objects 208a-h in the imagery. In such a manner, for example, the first AI module 242a may be utilized to quickly and easily identify the number of discrete objects 208a-h at the location "A". According to some embodiments, the first AI module 242a may identify locations (relative and/or absolute geospatial positions) of each of the discrete objects 208a-h and such locations may be utilized, for example, to develop a flight plan and/or identify the subsets of discrete objects 208a-h for which the second imagery should be acquired.

In some embodiments, a second one of the AI modules 242b may comprise and/or define AI programming logic that is directed to taking the second imagery data (e.g., close-up or perspective view imagery) as input, analyzing imagery features (e.g., lines, shadows, distances, colors, shapes, make and/or model textual badges, license plate numbers, VIN information, hood ornaments, logos, trademarks) to identify a type (e.g., make and model in the case of vehicles) for each of the discrete objects 208a-h, and outputting a listing of the makes, models, and/or other identifying information representing each of the discrete objects 208a-h in the imagery (e.g., an itemized listing of each type of each discrete objects 208a-h and/or a summary of counts by type—e.g., four (4) Ford® Explorer™ vehicles, three (3) 2016 Jeep® Wrangler™ vehicles, etc.).

According to some embodiments, a third one of the AI modules 242c may comprise and/or define programming logic that is directed to identifying and/or quantifying damage to the discrete objects 208a-h. The third AI module 242c may, for example, utilize one or more of the first and second imagery as input, analyze features within the imagery (e.g., vehicle profile template and/or manufacturer image information, as compared to actual profile and/or image information) to identify one or more areas of damage or non-conformity of any of the discrete objects 208a-h. In some embodiments, the damage information and/or identification may be compared and/or cross-referenced with repair and/or replacement data (e.g., the data 244) to calculate an expected monetary amount of damage (e.g., loss) for any or all of the discrete objects 208a-h—e.g., by the third AI module 242c and/or by a fourth and/or additional AI module 242n. In such a manner, for example, the AI modules 242a-n may (i) identify a number of discrete objects 208a-h at the location "A", (ii) identify the types of discrete objects 208a-h at the location "A", (iii) identify any visible damage to any of the discrete objects 208a-h at the location "A", and/or (iv) quantify (e.g., estimate a dollar amount) the total amount of damage for the location "A".

In some embodiments, the mobile electronic device 202 may comprise a smart mobile phone, such as the iPhone® 8 or a later generation iPhone®, running iOS 10 or a later generation of iOS, supporting Location Services. The iPhone® and iOS are produced by Apple Inc., however, embodiments herein are not limited to any particular portable computing device or smart mobile phone. For example, the mobile electronic device 202 may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable form-factor devices by any vendor containing at least one Central Processing Unit (CPU) and a wireless communication device (e.g., the communication antenna 214*a-b*).

According to some embodiments, the mobile electronic device 202 runs (i.e., executes) the mobile device software application ("app") that causes the generation and/or output of the GUI 220. In some embodiments, the app works with Location Services supported by an iOS operating system executing on the mobile electronic device 202. The app may include, comprise, and/or cause the generation of the GUI 220, which may be utilized, for example, for transmitting and/or exchanging data through and/or via one or more of the wireless networks 204*a-b*. In some embodiments, once the app receives captured data from one or more of the drones 206*a-b*, the app in turn transmits the captured data through a first interface for exchanging data (not separately depicted in FIG. 2) and through the second wireless network 204*b*. The second wireless network 204*b* may, in some embodiments, route the data out through a second interface for exchanging data (not shown) to the remote server 210. According to some embodiments, the app includes specially-programmed software code that includes one or more address identifiers such as Uniform Resource Locator (URL) addresses, Internet Protocol (IP) address, etc., that point to and/or reference the server 210.

Fewer or more components 202, 204*a-b*, 206*a-b*, 208*a-h*, 210, 214*a-b*, 216*a-b*, 218*a-b*, 220, 232*a-b*, 240, 242*a-n*, 244 and/or various configurations of the depicted components 202, 204*a-b*, 206*a-b*, 208*a-h*, 210, 214*a-b*, 216*a-b*, 218*a-b*, 220, 232*a-b*, 240, 242*a-n*, 244 may be included in the system 200 without deviating from the scope of embodiments described herein. In some embodiments, the components 202, 204*a-b*, 206*a-b*, 208*a-h*, 210, 214*a-b*, 216*a-b*, 218*a-b*, 220, 232*a-b*, 240, 242*a-n*, 244 may be similar in configuration and/or functionality to similarly named and/or numbered components as described herein. In some embodiments, the system 200 (and/or portion thereof) may comprise an automatic accident analysis program, system, and/or platform programmed and/or otherwise configured to execute, conduct, and/or facilitate the method 400 of FIG. 4 herein, and/or portions thereof.

Figure 3:
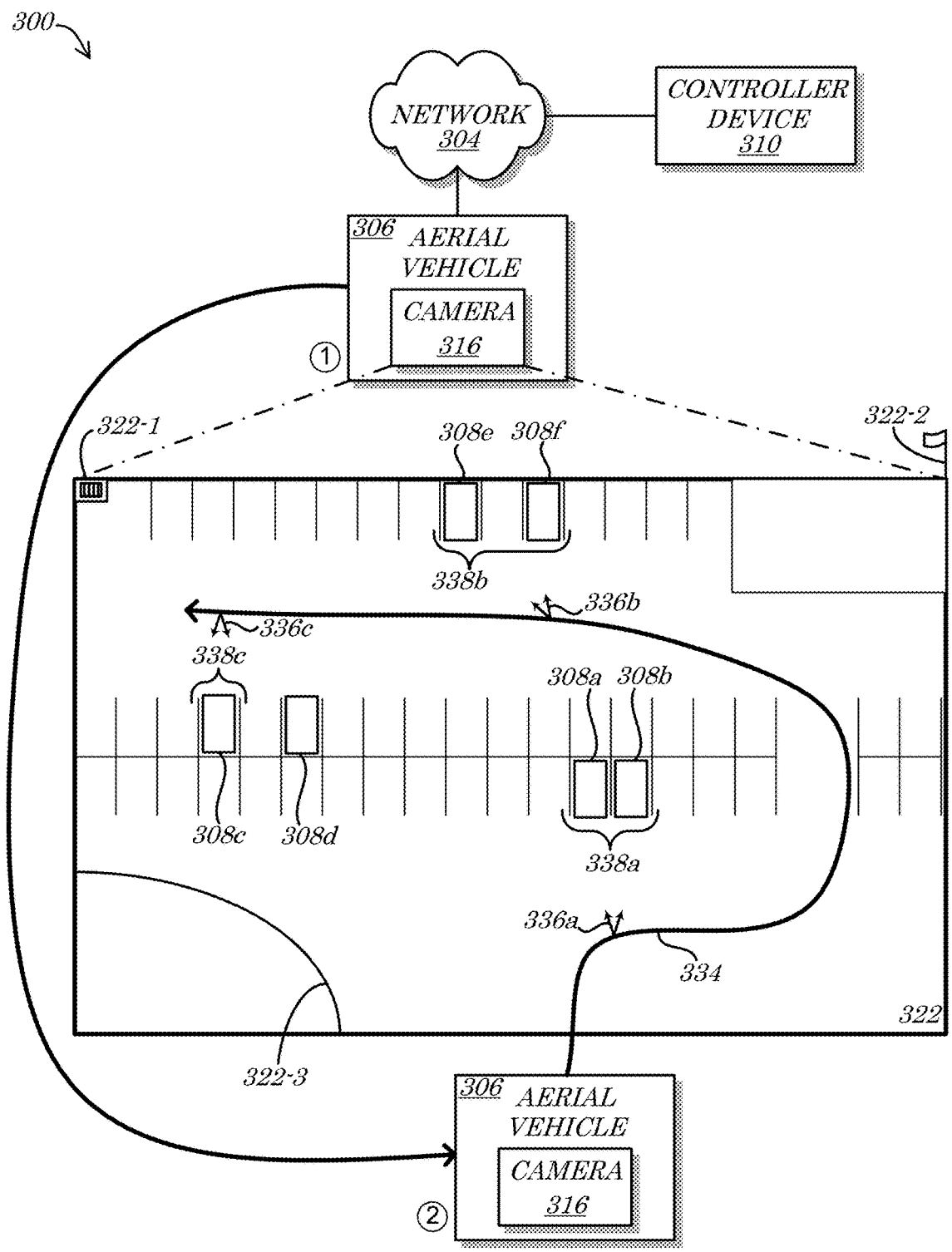
FIG. 3 is a block diagram of a system according to some embodiments.

Referring now to FIG. 3, a block diagram of a system 300 according to some embodiments is shown. In some embodiments, the system 300 may comprise a network 304 via which an aerial vehicle 306 may communicate imagery of multiple discrete objects 308*a-f*. According to some embodiments, the aerial vehicle 306 may be in communication, via the network 304, with a controller device 310. The controller device 310 may comprise, for example, a server and/or a mobile electronic device, such as the server 210 and the mobile electronic device 202 of FIG. 2 herein. According to some embodiments, the aerial vehicle 306 may comprise a camera 316. The camera 316 may capture, in the case that the aerial vehicle 306 is disposed at a first location "1" (e.g., at a first coordinate position and/or first altitude), for example, first or overhead imagery 322 of a location (e.g., a parking lot, as depicted in accordance with the ongoing and non-limiting example).

According to some embodiments, the first imagery 322 may comprise one or more still images, video images, audio, graphically-depicted sensor readings (e.g., an Infrared Radiation (IR) "heat map"), and/or other graphical data descriptive of an overhead/bird's-eye view of the multiple discrete objects 308*a-f*. In some embodiments, the first imagery 322 may be analyzed (e.g., by the controller device 310) to identify image/video features indicative and/or descriptive of the location and/or the multiple discrete objects 308*a-f*. Object and/or pattern recognition algorithms and/or applications (e.g., the AI modules 242*a-n* of FIG. 2) may be utilized, for example, to identify location features, such as lane/parking lines, curbs, pavement markings, drainage basins, flags, posts, poles, trees, vehicle outlines, vehicle hood or roof shapes, shadows, etc. In some embodiments, certain objects, such as a specific catch basin 322-1, flag 322-2 (or other marker or target), and/or a curb 322-3 (or other boundary) may be identified utilizing data from the controller device 310 and may be utilized to define the first location "1". The aerial vehicle 306 may position itself (e.g., at the command or direction of the controller device 310) over the parking lot and begin climbing in altitude, for example, until one or more of (in some cases, all of) the specific objects 322-1, 322-2, 322-3 is identified as being visible in a field of view of the camera 316. In some embodiments, upon detection and/or identification of any specific objects 322-1, 322-2, 322-3 within the field of view, the camera 316 may be automatically activated to capture the first imagery 322. As described herein, the first imagery 322 may then be analyzed (e.g., by the controller device 310) to identify the existence and/or locations of each of the discrete objects 308*a-f*.

According to some embodiments, a spatial recognition algorithm and/or application may be utilized, for example, to derive an estimated distance between each of the discrete objects 308*a-f* and/or between any discrete object 308*a-f* and other features (e.g., the specific objects 322-1, 322-2, 322-3) at the location. In some embodiments, location data for the discrete objects 308*a-f* may be utilized to develop a strategy and/or plan for acquiring identifiable information from each of the discrete objects 308*a-f*. In the exemplary case of vehicles, for example, the locations of the discrete objects 308*a-f* along with stored rules regarding license plate, VIN, manufacturer badges or logos, and/or other identification information locations (e.g., rear of vehicle, front of vehicle, front dashboard), may be utilized to develop a flight plan 334 for the aerial vehicle 306. As depicted in FIG. 3, (and as overlaid on the first imagery 322 for convenience of illustration) for example, the flight plan 334 may direct the aerial vehicle 306 to a second location "2" (e.g., at a second coordinate position and/or second altitude) from which the aerial vehicle 306 may be directed to capture second imagery (not shown) in a first orientation 336*a* toward a first subset 338*a* of the discrete objects 308*a-f*.

In some embodiments, the second imagery may comprise a low-altitude perspective, front, rear, and/or side view of the first subset 338*a* of the discrete objects 308*a-f*. The aerial vehicle 306 may, for example, pass behind a first discrete object 308*a* and a second discrete object 308*b* and take a photograph of the rear license plates (and/or make and model badges, emblems, or logos; none of which are shown)

thereof. According to some embodiments, the flight plan 334 may direct the aerial vehicle 306 to capture third imagery (not shown) in a second orientation 336b toward a second subset 338b of the discrete objects 308a-f. The aerial vehicle 306 may, for example, pass in front of a fifth discrete object 308e and a sixth discrete object 308f and take a photograph of the respective VIN information through the windshields (not shown) thereof. According to some embodiments, the second orientation 336b may be selected and/or computed to account for sun glare, windshield shapes, and/or other obstructions such that the aerial vehicle 306 may be most favorably positioned to acquire the VIN information. In some embodiments, the flight plan 334 may include and/or invoke various obstacle avoidance and/or imagery optimization algorithms, routines, and/or maneuvers. In the case that the aerial vehicle 306 arrives to capture the third imagery of the second subset 338b of the discrete objects 308a-f and encounters difficulty acquiring (e.g., via Optical Character Recognition (OCR) and/or other data acquisition analysis of live feed from the camera 316) the VIN (or other desired) information, for example, the aerial vehicle 306 may execute a series of turns, orientation changes, altitude changes, etc., in an attempt to capture the desired third imagery from different positions near or around the second subset 338b of the discrete objects 308a-f. In some embodiments, the flight plan 334 may direct the aerial vehicle 306 to capture fourth imagery (not shown) in a third orientation 336c toward a third subset 338c of the discrete objects 308a-f. The aerial vehicle 306 may, for example, pass alongside a third discrete object 308c and/or a fourth discrete object 308d and scan a vehicle and/or account identifier barcode on a side-window (not shown) thereof.

In such a manner, for example, the aerial vehicle 306 (or a plurality of cooperative aerial vehicles 306 as described herein) may capture imagery that may be utilized (e.g., by the controller device 310) to identify, type-cast, and/or categorize each one of the discrete objects 308a-f. According to some embodiments, the flight plan 334 may also or alternatively be utilized to search for and/or identify damage to any of the discrete objects 308a-f. The flight plan 334 may direct the aerial vehicle 306, for example, to move in a pattern (e.g., a grid-pattern) throughout the parking lot and take pictures (or other imagery or sensing activities) at various locations, altitudes, angles, and/or orientations to acquire full-exterior view imagery (top, sides, front, and back) of each of the discrete objects 308a-f. Such imagery may be utilized as described herein to scan and/or analyze for any visible damage to any of the discrete objects 308a-f.

According to some embodiments, any or all imagery (and/or other acquired data) descriptive of the discrete objects 308a-f may be transmitted by the aerial vehicle 306, via the network 304, to the controller device 310. The controller device 310 may, in response to the receiving of the imagery, initiate one or more AI and/or other logical and/or rules-based programming routines to count the number of discrete objects 308a-f, identify a type, make, model, year, version, color, owner, driver, and/or account number for each discrete object 308a-f, identify any instances of visual damage to any of the discrete objects 308a-f, and/or quantify any identified damage based on stored repair estimate data for each type, make, model, etc. of the discrete objects 308a-f.

Fewer or more components 304, 306, 308a-f, 310, 316, 334, 336a-c, 338a-c and/or various configurations of the depicted components 304, 306, 308a-f, 310, 316, 334, 336a-c, 338a-c may be included in the system 300 without deviating from the scope of embodiments described herein. In some embodiments, the components 304, 306, 308a-f, 310, 316, 334, 336a-c, 338a-c may be similar in configuration and/or functionality to similarly named and/or numbered components as described herein. In some embodiments, the system 300 (and/or portion thereof) may comprise an automatic multi-object damage analysis program, system, and/or platform programmed and/or otherwise configured to execute, conduct, and/or facilitate the method 400 of FIG. 4 herein, and/or portions thereof.

III. Automated Multi-Object Damage Analysis Processes

Figure 4:
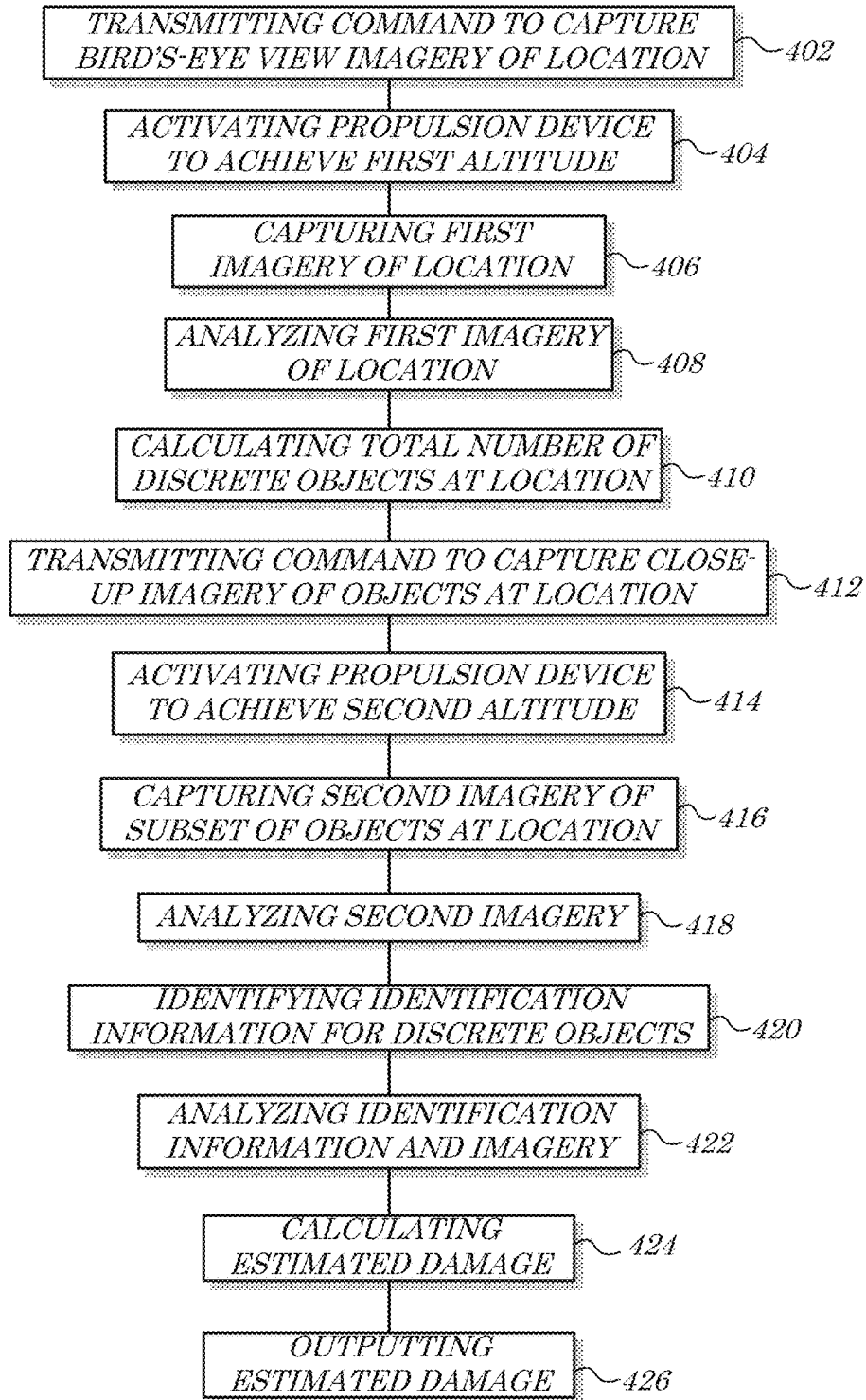
FIG. 4 is a flow diagram of a method according to some embodiments.

Turning now to FIG. 4, a flow diagram of a method 400 according to some embodiments is shown. In some embodiments, the method 400 may be performed and/or implemented by and/or otherwise associated with one or more specialized and/or specially-programmed computers (e.g., the user/mobile electronic device 102, 202 and/or the server device/server 110, 210 and/or controller device 310 of FIG. 1, FIG. 2, and/or FIG. 3 herein), computer terminals, computer servers, computer systems and/or networks, and/or any combinations thereof (e.g., by one or more multi-threaded and/or multi-core processing units of an insurance company claims data processing system). In some embodiments, the method 400 may be embodied in, facilitated by, and/or otherwise associated with various input mechanisms and/or interfaces (such as the interfaces 220, 520a-f, 620 of FIG. 2, FIG. 5A, FIG. 5B, FIG. 5C, FIG. 5D, FIG. 5E, FIG. 5F, and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240, 640, 740a-e of FIG. 1, FIG. 2, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

In some embodiments, the method 400 may comprise transmitting (e.g., by an electronic processing device and to an aerial vehicle) a command to capture bird's-eye view (or first) imagery of a location, at 402. A user of a mobile electronic device and/or of a server may, for example, open, run, execute, and/or allow or enable a software program and/or application programmed to automatically assess and/or analyze damage to a plurality of objects at a location. In some embodiments, a specially-programmed mobile device application may be executed and/or initiated on a mobile device of a user, such as a smart phone device. According to some embodiments, the initiation of the application may cause an identification of the location (e.g., a mailing address, geo-spatial coordinates, relative coordinates, and/or movement directions) to be transmitted, e.g., via a wireless network and/or utilizing a wireless transceiver device, to an aerial vehicle. According to some embodiments, a definition and/or identification of a desired first altitude, orientation, heading, angle, and/or identification of location boundary markers, targets, or objects (e.g., existing curb lines, trees, buildings, pavement markings, and/or placed markers or targets, such as flags, cones, reflectors, and/or laser designators) may be transmitted to the aerial vehicle. In some embodiments, the command and/or information transmitted to the aerial vehicle may comprise flight plan and/or specific propulsion and/or flight control data.

According to some embodiments, the method 400 may comprise activating (e.g., by the electronic aerial vehicle) a propulsion device to achieve a first altitude, at 404. The aerial vehicle may comprise one or more propulsion devices powered by an energy source, such as a battery, for example, and may energize the propulsion device upon receiving, e.g., via a wireless transceiver device, the command(s) and/or information transmitted by the user device and/or server at 402. In some embodiments, the aerial vehicle may compute and/or identify a desired location (e.g., coordinates and/or altitude) in response to the receiving of the command/information and may activate the propulsion device and/or one or more control surfaces to direct the aerial vehicle toward the location. In some embodiments, such as in the case that flight plan and/or flight control data is received, the aerial vehicle may implement the commands/plans (e.g., without necessarily being privy to the final or intended location/altitude). According to some embodiments, the first altitude may be achieved by comparing live feed from a camera of the aerial vehicle to one or more sample images and/or boundary data items to identify when the extents of the desired location fit within a field of view of the camera. The aerial vehicle may continuously monitor the camera feed as it climbs in altitude (and/or otherwise positions itself), for example, and upon an identification of the extents of the location existing within the field of view, may stop gaining altitude (thereby defining the first altitude) and/or may otherwise hold position (e.g., a first position with respect to the target location). According to some embodiments, the first altitude may generally be less than four hundred feet (400 ft; 122 m) but greater than one hundred feet (100 ft; 30.5 m)—e.g., generally high enough to take a picture of an entire parking lot or other large area comprising a plurality of target objects.

In some embodiments, the method 400 may comprise capturing (e.g., by the camera of the aerial vehicle) first imagery of the location, at 406. The camera may comprise any type or configuration of imaging and/or sensor device that is operable to acquire data descriptive of the location from the first altitude. Upon reaching the first altitude and/or the desired first location, in some embodiments, the aerial vehicle may activate the camera to acquire imagery of the location. The imagery may generally comprise one or more photographs, video, and/or other sensor readings. In some embodiments, the aerial vehicle may capture imagery from multiple angles and/or may shift position (higher, lower, and/or laterally) to capture additional imagery of the same location from a slightly different position—e.g., to acquire a set of first imagery in accordance with aerial photogrammetric procedures. In some embodiments, any or all data defining the first imagery may be transmitted to the user device and/or server.

According to some embodiments, the method 400 may comprise analyzing (e.g., by the electronic processing device) the first imagery of the location, at 408. Upon receipt of first imagery data from the aerial vehicle, for example, the user device and/or the server may execute and/or initialize one or more stored procedures and/or analytical routines, such as a first AI module (e.g., the AI modules 142 and/or the first AI module 242a of FIG. 1 and/or FIG. 2 herein). The first AI module may comprise programming logic that searches the first imagery for shapes, colors, and/or other objects indicative of the various discrete objects at the location. According to some embodiments, the first AI module may utilize one or more shape identification algorithms to identify areas within the first imagery that match stored shapes indicative of vehicle parts, such as hoods, roofs, outlines, profiles, etc. In some embodiments, the first AI module may identify each discrete object in the first imagery and/or may identify and/or record a location (centroid, corner of bumper, polygon vertices representing an outline) for each object. According to some embodiments, the boundaries and/or other identified features of the discrete objects may be output to a user for verification and/or editing. A user of the user device that receives indications of the identified objects from the first AI module (e.g., via a GUI) may, for example, provide input selecting which object identifications to accept, delete, combine, separate, etc. The user may notice, for example, that a vehicle in an adjacent parking lot was identified by the first AI module and may choose to delete reference of that particular identification (for it may not be relevant to the overall analysis of the location, such as determining a total amount of losses for a particular insurance customer and/or insured location).

In some embodiments, the method 400 may comprise calculating (e.g., by the electronic processing device) a total number of discrete objects at the location, at 410. The first AI module may, for example, count each discrete object identified at 408 from the first imagery. According to some embodiments, the first AI module may accept the first imagery as digital input and may output a total number of discrete objects (e.g., vehicles) at the location (and/or indications of their locations—coordinates and/or graphical overlays) by summing the number of different/discrete object boundaries identified by the shape identification algorithm(s).

According to some embodiments, the method 400 may comprise transmitting (e.g., by the electronic processing device and/or to the aerial vehicle) a command to capture close-up view (or second) imagery of the location, at 412. A user of a mobile electronic device and/or of a server may, for example, utilize the software program and/or application programmed to automatically assess and/or analyze damage to the plurality of objects at the location, by causing flight plan instructions to be transmitted, e.g., via a wireless network and/or utilizing a wireless transceiver device, to the aerial vehicle. According to some embodiments, a definition and/or identification of a desired second altitude, orientation, heading, angle, and/or identification of specific discrete objects and/or locations thereof may be transmitted to the aerial vehicle. In some embodiments, the command and/or information transmitted to the aerial vehicle may comprise flight plan and/or specific propulsion and/or flight control data.

In some embodiments, the flight plan may comprise an identification of various locations at which the aerial vehicle is desired to capture close-up imagery of subsets of the discrete objects. The number and/or locations of discrete objects may be parsed and/or divided into a number of subsets or groups, for example, and a flight path to and/or between such subsets/groups may be plotted utilizing one or more navigational algorithms. According to some embodiments, the transmission may comprise a listing of discrete locations and/or angles/orientations and the aerial vehicle may utilize on-board navigational and/or flight logic to develop a flight plan for travel to each of the listed discrete locations. In some embodiments, the flight plan may be based on data descriptive of the discrete objects that has been acquired from the first imagery by the first AI module (e.g., discrete location data for each identified discrete object at the location).

According to some embodiments, the method 400 may comprise activating (e.g., by the electronic aerial vehicle) the propulsion device to achieve the second altitude, at 414. The aerial vehicle may energize the propulsion device upon receiving, e.g., via the wireless transceiver device, the command(s) and/or information transmitted by the user device and/or server at 412. In some embodiments, the aerial vehicle may compute and/or identify a desired location (e.g., coordinates and/or altitude) in response to the receiving of the command/information and may activate the propulsion device and/or one or more control surfaces to direct the aerial vehicle toward the location. In some embodiments, such as in the case that flight plan and/or flight control data is received, the aerial vehicle may implement the commands/plans (e.g., without necessarily being privy to the final or intended location/altitude).

In some embodiments, the aerial vehicle may execute the flight plan by comparing live feed from the camera of the aerial vehicle to one or more sample images and/or shape data items to identify when identification information for each subset of the discrete objects is visible within the field of view of the camera. The aerial vehicle may continuously monitor the camera feed as it positions itself near a first subset of the discrete objects, for example, and upon a detection of discrete object identification information (e.g., license plate numbers, barcodes, VIN identifiers, etc.) within the field of view, may hold position (e.g., a second position with respect to the target location). According to some embodiments, the second altitude (e.g., of the second position) may generally be less than twenty feet (20 ft; 6 m) but may be higher in the case of larger or higher discrete objects, such as large trucks, construction equipment, etc.—e.g., generally high enough to take a picture of the subset of discrete objects with the extents of the subset of objects fitting within the field of view. In some embodiments, such as in the case that only identification information is desired, the second altitude may generally be less than six feet (6 ft; 1.8 m) and/or the entire subset of objects may not fit entirely within the field of view—e.g., the close-up field of view may comprise a view of one or more license plates and some surrounding areas, but not an entirety of any particular discrete object or an entirety of any particular subset of discrete objects.

In some embodiments, the method 400 may comprise capturing (e.g., by the camera of the aerial vehicle) second imagery of a first subset of the discrete objects at the location, at 416. Upon reaching the second altitude and/or the desired second location, in some embodiments, the aerial vehicle may activate the camera to acquire imagery of the first subset of the discrete objects at the location. The imagery may generally comprise one or more photographs, video, and/or other sensor readings. According to some embodiments, the aerial vehicle may repeat the capturing for each subset of the discrete objects at the location, e.g., as it traverses various waypoints of the flight plan (e.g., the second imagery may comprise a plurality of second imagery items/photos). In some embodiments, the aerial vehicle may conduct OCR and/or other real-time analysis of imagery input to identify readable identification data descriptive of the discrete object(s) in the subset of objects. In some embodiments, any or all data defining the first imagery may be transmitted to the user device and/or server.

According to some embodiments, the method 400 may comprise analyzing (e.g., by the electronic processing device) the second imagery of the subset of discrete objects at the location, at 418. Upon receipt of second imagery data from the aerial vehicle, for example, the user device and/or the server may execute and/or initialize one or more stored procedures and/or analytical routines, such as a second AI module (e.g., the AI modules 142 and/or the second AI module 242*b* of FIG. 1 and/or FIG. 2 herein). The second AI module may comprise programming logic that searches the second imagery for shapes, colors, and/or other objects indicative of identifiers of the various discrete objects at the location. According to some embodiments, the second AI module may utilize one or more shape identification algorithms to identify areas within the second imagery that match stored shapes indicative of vehicle license plates, license plate numbers (alphanumeric), VIN identifiers, manufacturer names and/or logos (e.g., hood ornaments or symbols), vehicle model or serial number information, barcodes, etc. In some embodiments, the second AI module may identify each discrete object identifier in the second imagery. According to some embodiments, the boundaries and/or other identified features of the identification information for the discrete objects may be output to a user for verification and/or editing. A user of the user device that receives indications of the identification information artifacts/objects from the second AI module (e.g., via a GUI) may, for example, provide input selecting which artifacts/objects to accept, delete, combine, separate, etc. The user may notice, for example, that a bumper sticker was identified by the second AI module and may choose to delete reference of that particular artifact/object (for it may not be relevant to the overall analysis, such as identifying a make/model of a particular discrete object). According to some embodiments, the second imagery analyzed at 418 may comprise a plurality of second imagery, each element being directed to a separate subset of the discrete objects at the location and/or the analysis may be repeated for each subset of discrete objects and imagery thereof.

In some embodiments, the method 400 may comprise identifying (e.g., by the electronic processing device) identification information for the discrete objects at the location, at 420. The second AI module may, for example, perform OCR and/or other recognition analysis routines on each artifact/object identified at 418 from the second imagery. According to some embodiments, the second AI module may accept the second imagery as digital input and may output a listing of identifiers (e.g., alphanumeric) for the discrete objects at the location. In such a manner, for example, a make/model and/or other identification information for each discrete object may be captured and recorded and stored in association with each discrete location at the overall target location.

According to some embodiments, the method 400 may comprise analyzing (e.g., by the electronic processing device) the identification information and the imagery, at 422. The user device and/or the server may execute and/or initialize one or more stored procedures and/or analytical routines, such as a third AI module (e.g., the AI modules 142 and/or the third AI module 242*c* of FIG. 1 and/or FIG. 2 herein), for example, to identify damage sustained by the discrete objects. The third AI module may comprise programming logic that searches the first and/or second imagery for shapes, colors, and/or other objects indicative of visible damage (e.g., dents, rust), for example, and catalogs a type and/or estimated extent of damage based on imagery analysis results. The first and/or second imagery may be utilized, for example, to identify any areas of visible damage to a particular discrete object and/or a type of damage such as cracked windshield, dented roof, flat tire, broken side mirror, etc.

In some embodiments, the method 400 may comprise calculating (e.g., by the electronic processing device) an estimated amount of damage, at 424. The user device and/or the server may execute and/or initialize one or more stored procedures and/or analytical routines, such as the third AI module (and/or a fourth AI module), for example, to quantify or estimate an amount of the identified damage sustained by the discrete objects. The third (and/or fourth) AI module may comprise programming logic that searches stored data (e.g., a repair estimate database) based on the identified type of damage and discrete object identification information (e.g., make/model), for example, to calculate a total estimated monetary amount that would be required to repair the identified damage (e.g., replace a cracked windshield, repair a dented roof or hood, etc.). According to some embodiments, a total amount of estimated damage/repair costs for all of the discrete objects at the location may be calculated by summing the individual estimates for each discrete object.

According to some embodiments, the method 400 may comprise outputting (e.g., by the electronic processing device and/or via an output device of the user device and/or server) an indication of the estimated damage, at 426. The total estimated damage for the location and/or an itemized listing of damage estimates grouped by subset and/or discrete object type, identification, and/or location, may for example be output via a GUI generated by the mobile device application. In such a manner for example, a mobile electronic device and at least one aerial vehicle may be utilized to quickly, easily, and automatically calculate a total amount of estimated losses for a plurality of discrete objects disposed at a particular location (e.g., dozens or hundreds of vehicles in a large parking lot that has experienced a hailstorm), with such results being output to facilitate expedited claims analysis and/or compensation. In some embodiments, the damage analysis and/or estimation results may be compared to data descriptive of a storm or other loss event to determine whether the identified (and quantified) damage was likely sustained by a particular event and/or was sustained during a period of insurance coverage. Embodiments herein may be utilized in conjunction with storm and/or fraud detection analysis methods, as described in U.S. Patent Application Publication No. 2015/0170288, published on Jun. 18, 2015 and titled "SYSTEMS AND METHODS FOR WEATHER EVENT-BASED INSURANCE CLAIM HANDLING", the storm/damage analysis and claim handling concepts and descriptions of which are hereby incorporated by reference herein, for example, to execute one or more insurance-related actions, such as approving and/or paying a claim (partially or in full) or denying a claim (partially or in full) for the location, a particular subset of the discrete objects, and/or for a particular discrete object at the location.

While the processing, analysis, identification, and/or calculation features of the method 400 are generally described as being performed by a user device and/or server device, the electronic processing device may comprise one or more processing units of the user device/mobile electronic device, the server, and/or the aerial vehicle. The aerial vehicle may comprise the electronic processing device, for example, and may conduct some or all of the imagery analysis described herein. In such embodiments, the server may not be desirable or necessary in execution of the method 400.

IV. Automated Accident Analysis Interfaces

Turning now to FIG. 5A, FIG. 5B, FIG. 5C, FIG. 5D, FIG. 5E, and FIG. 5F, diagrams of a system 500 depicting a user device 502 providing instances of an example interface 520*a-f* according to some embodiments are shown. In some embodiments, the interface 520*a-f* may comprise a web page, web form, database entry form, API, spreadsheet, table, and/or application or other GUI by which a user or other entity may activate and/or utilize one or more aerial vehicles to acquire and analyze damage estimation data for a plurality of objects at a given location, as described herein. The interface 520*a-f* may, for example, comprise a front-end of an automatic multi-object detection, verification, and/or analysis program and/or platform programmed and/or otherwise configured to execute, conduct, and/or facilitate the method 400 of FIG. 4 herein, and/or portions thereof. In some embodiments, the interface 520*a-f* may be output via a computerized device, such as the user device 502, which may for example, be similar in configuration to one or more of the user/mobile electronic devices 102, 202 and/or the server device/server 110, 210 and/or controller device 310 of FIG. 1, FIG. 2, and/or FIG. 3 herein.

Figure 5A:
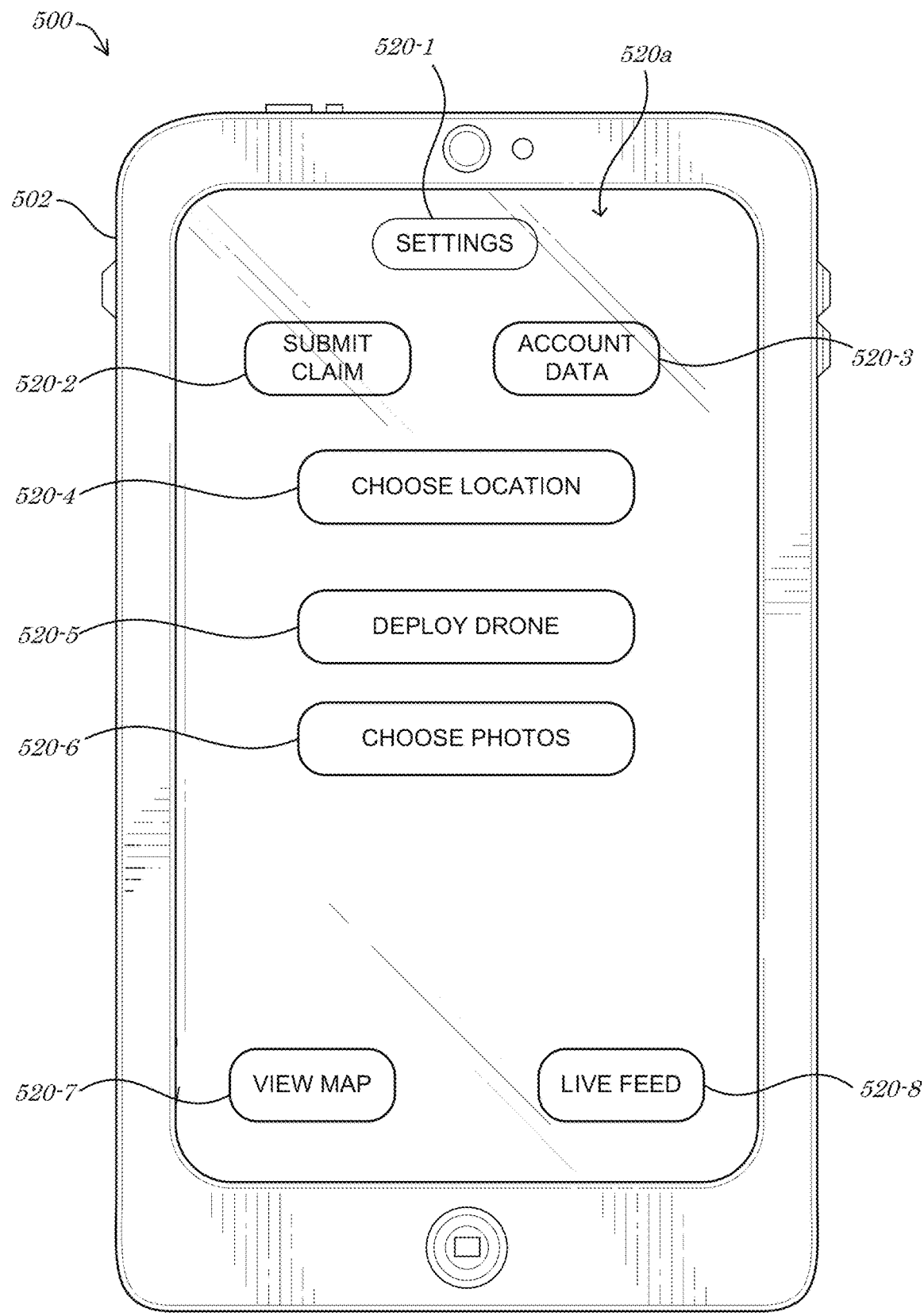
FIG. 5A, FIG. 5B, FIG. 5C, FIG. 5D, FIG. 5E, and FIG. 5F are diagrams of a system depicting example interfaces according to some embodiments.

According to some embodiments, the interface 520*a-f* may comprise one or more tabs and/or other segmented and/or logically-presented data forms and/or fields. In some embodiments, the interface 520*a-f* may be configured and/or organized to allow and/or facilitate entry and/or acquisition of information regarding a potential loss event, location, and/or device or object associated with such an event and/or location. According to some embodiments, the interface 502*a-f* may comprise a menu page from which a user may select one or more options that initiate specific functionality of a mobile device application executed by the user device 502. As depicted in FIG. 5A, for example, a first version (or page or instance) of the interface 520*a* may comprise a "Menu" or "Home Page" interface (e.g., defining a first input and/or output mechanism) by providing an area (e.g., one or more data entry mechanisms, tools, objects, and/or features) that provides for selection/activation of (i) a "settings" button 520-1, (ii) a "submit claim" button 520-2, (iii) an "account data" button 520-3, (iv) a "choose location" button 520-4, (v) a "deploy drone" button 520-5, (vi) a "choose photos" button 520-6, (vii) a "view map" button 520-7, and/or (viii) a "live feed" button 520-8.

In some embodiments, the first version (or page or instance) of the interface 520*a* may be utilized to enable access to various multi-object damage analysis information and/or functionality. The settings button 520-1 may, when actuated or selected by the user, for example, permit definition and/or editing of values that govern various settings and/or preferences, such as camera and/or sensor recording frequencies, resolutions, and/or exposure settings, insurance policy information, location information, contact information, aerial vehicle parameters and/or information, and/or rules definitions. Rules definitions may comprise, for example, definitions for one or more rules that govern (i) bird's-eye imagery acquisition, (ii) close-up imagery acquisition, (iii) object (e.g., vehicle) shape identification, (iv) text and/or visual identification data recognition, (v) damage shape identification, (vi) damage estimation, and/or (vii) claim handling (e.g., approve, deny, etc.).

According to some embodiments, the submit claim button 520-2 may, when actuated or selected by the user, initiate a sub-routine that transmits a signal to an insurance company server (not shown) and provides damage notification, details, and/or evidence (e.g., camera images/video). In some embodiments, the submit claim button 520-2 may be generated and/or enabled upon acquisition of location and/or object imagery and/or calculation of a total estimated amount of damage/loss for a location, and/or may be output as a prompt to request claim initiation by a user (not shown). According to some embodiments, the account data button 520-3, when actuated or selected by the user, may initiate a sub-routine that directs the user to information input and/or output areas (e.g., additional interface views) that allow the user to access, retrieve, and/or edit various account parameters, such as an insurance account identifier, coverage dates, coverage limits, deductible amounts, etc. In some embodiments, the choose location button 520-4 may, when actuated or selected by the user, for example, initiate a sub-routine that directs the user to information input and/or output areas (e.g., additional interface views) for location selection and/or identification. Activation of the choose location button 520-4 may, for example, initiate and/or cause an outputting of current coordinates of the user device 502, a map interface (not depicted) via which the user may select a desired location, a mailing address lookup or reference tool, etc.

In some embodiments, the deploy drone button 520-5 may, when actuated or selected by the user, for example, initiate a sub-routine that activates one or more aerial vehicles by transmitting desired location, preference, and/or direction information to the aerial vehicle. According to some embodiments, the deploy drone button 520-5 may initiate a sub-routine that directs the user to information input and/or output areas (e.g., additional interface views) that permit the user to control and/or direct (e.g., fly) one or more aerial vehicles (e.g., drones). In some embodiments, the choose photos button 520-6 may, when actuated or selected by the user, for example, initiate a sub-routine that directs the user to information input and/or output areas (e.g., additional interface views) that permit the user to select, edit, and/or otherwise manage imagery captured by the aerial vehicle(s).

According to some embodiments, the view map button 520-7 may, when actuated or selected by the user, for example, initiate a sub-routine that directs the user to a map view or interface screen (not shown) that provides location-based graphical depictions of any or all of (i) the user's current location (e.g., a location of the user device 502 and/or a vehicle of the user—not shown) and/or previous locations (e.g., course taken/travel path), (ii) a target location (e.g., an address of an insured property and/or business), (iii) aerial vehicle locations (positions, altitudes, orientations), (iv) outlines of identified discrete objects, (v) flight plan data, and/or (vi) damage locations. In some embodiments, the live feed button 520-8 may, when actuated or selected by the user, for example, initiate a sub-routine that triggers a retrieval and/or downloading (e.g., streaming) of real-time imagery data transmitted from the aerial vehicle. In such a manner, for example, a user may see a current imaging view through the camera of the aerial vehicle and may, in response to the view, send a command to adjust the position and/or orientation of the aerial vehicle, capture imagery, zoom-in, zoom-out, etc.

Figure 5B:
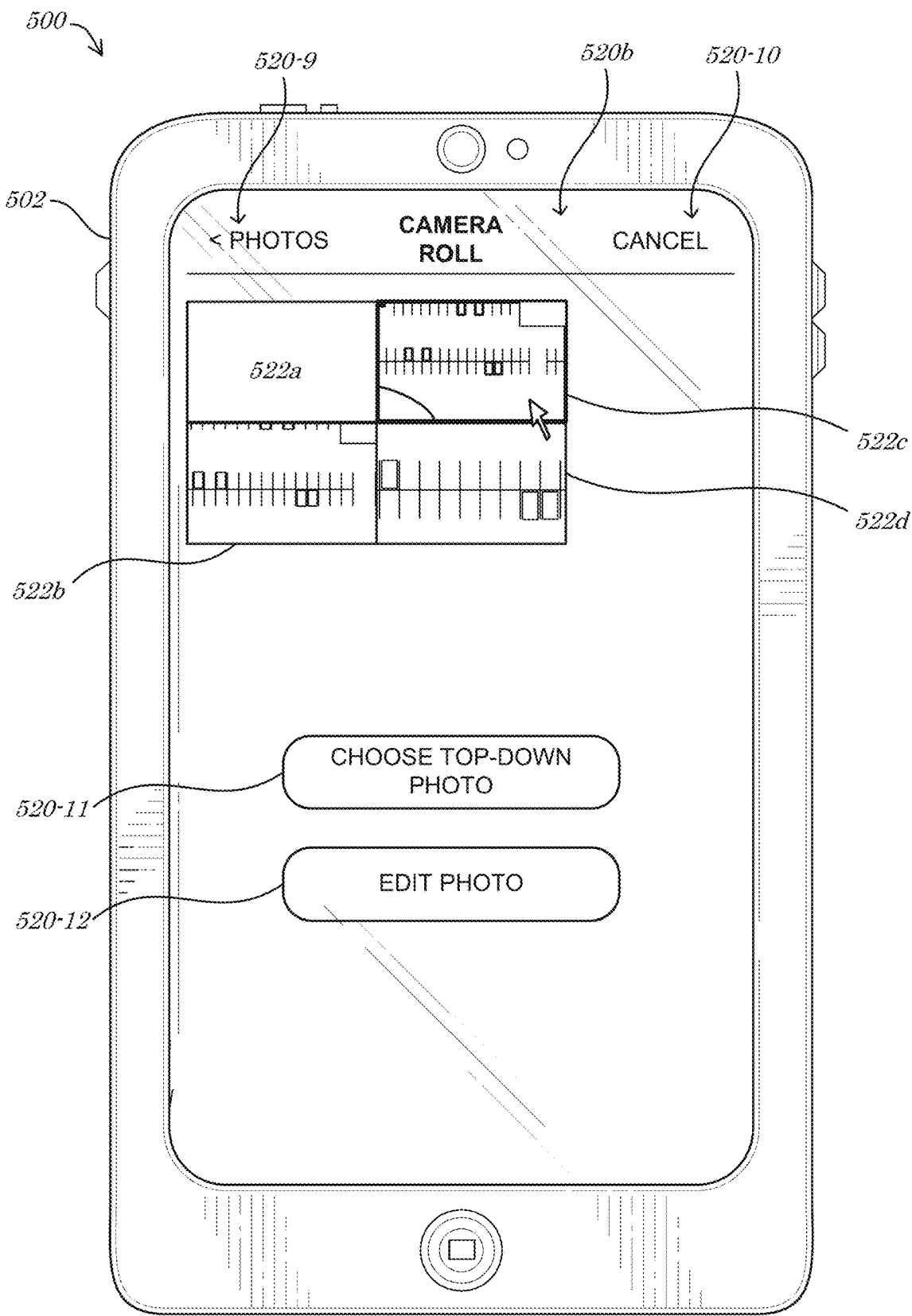

Referring to FIG. 5B, a second version (or page or instance) of the interface 520b may comprise a bird's-eye imagery selection interface (e.g., defining a second input and/or output mechanism) by providing a "photos" link 520-9, a "cancel" link 520-10, a "choose top-down photo" button 520-11, and/or an "edit photo" button 520-12. The second version (or page or instance) of the interface 520b may be utilized, for example, to review, edit, and/or select one or more first, bird's-eye, overhead, high-altitude, and/or "top-down" images 522a-d of a target location (e.g., a parking lot as shown). In some embodiments, the photos link 520-9 may be utilized to navigate back to a photo library of the user device 502 and/or available from the aerial vehicle, and/or the cancel link 520-10 may be utilized to cancel out of top-down image selection, e.g., and return to the main menu/first version of the interface 520a. According to some embodiments, the user may select a desired image 522c from among the available top-down images 522a-d (e.g., a selection of a third top-down image 522c, as shown) and/or may commit to utilizing the selected image 522c (e.g., for automatic discrete object counting) by selecting the choose top-down photo button 520-11 after a highlighting of or focus on the selected image 522c. In some embodiments, the user may choose to edit the selected image 522c (e.g., zoom-in, zoom-out, crop, cut a portion) by activation of the edit photo button 520-12.

Figure 5C:
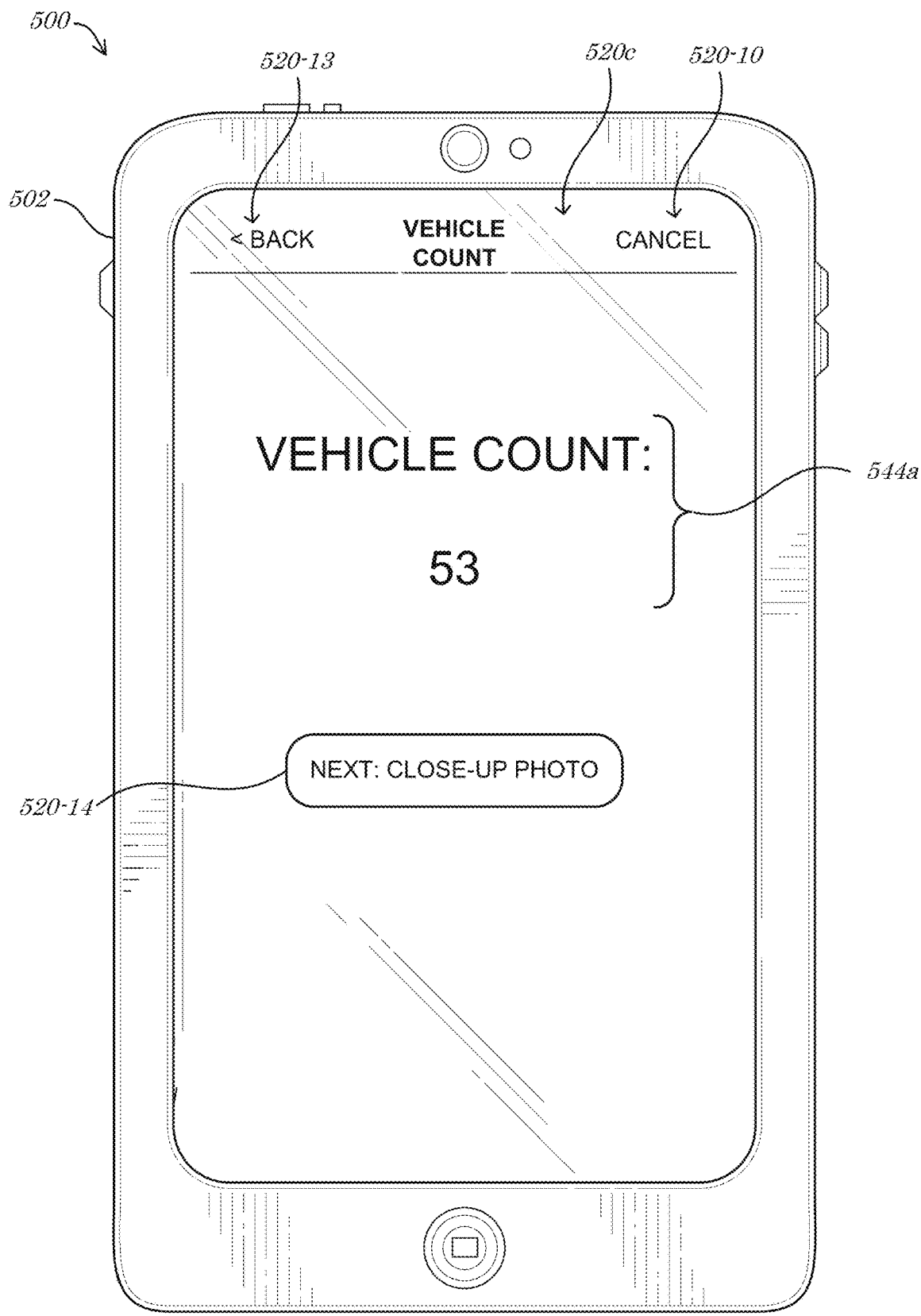
Figure 5D:
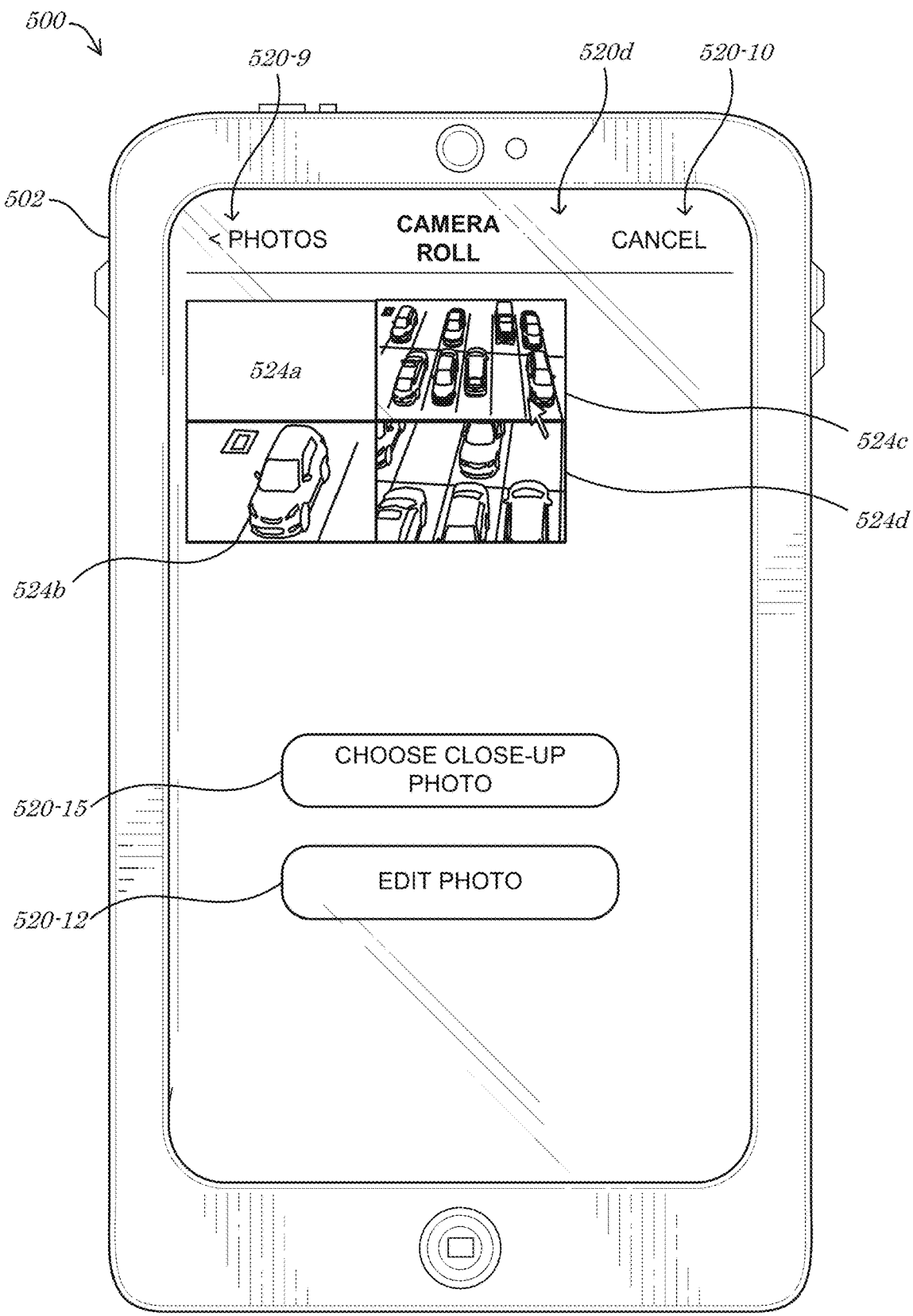

According to some embodiments, the choose top-down photo button 520-11 of the second version of the interface 520b may, for example, upon a triggering and/or receipt of input from the user (e.g., a properly-positioned click of a mouse or other pointer) with respect to the choose top-down photo button 520-11, initiate a sub-routine that causes an analysis of the selected top-down image 522c (e.g., an analysis by a first AI module operable to calculate a number of discrete objects in the selected image 522c). In some embodiments, a triggering of the analysis and/or of the choose top-down photo button 520-11 may cause a third version (or page or instance) of the interface 520c to be output, e.g., as depicted in FIG. 5C. The third version of the interface 520c may comprise, for example, a discrete object counting interface (e.g., defining a third input and/or output mechanism) by providing the cancel button 520-10, a "back" button 520-13, and/or a "next: close-up photo" button 520-14. The back button 520-13 may be utilized, for example, to revert back to a previous screen, such as the second version of the interface 520b. In some embodiments, the third version of the interface 520c may display a result of the first AI module processing, such as a total number of identified discrete objects 544a. According to some embodiments, the user may continue processing by selecting the "next: close-up photo" button 520-14, which may trigger a provision of a fourth version (or page or instance) of the interface 520d, e.g., as depicted in FIG. 5D.

In some embodiments, the fourth version (or page or instance) of the interface 520d may comprise a close-up imagery selection interface (e.g., defining a fourth input and/or output mechanism) by providing the "photos" link 520-9, the "cancel" link 520-10, the "edit photo" button 520-12, and/or a "choose close-up photo" button 520-15. The fourth version (or page or instance) of the interface 520d may be utilized, for example, to review, edit, and/or select one or more second, close-up, perspective, and/or low-altitude images 524a-d of the target location and/or a subset or portion thereof. In some embodiments, the user may select a desired image 524c from among the available close-up images 524a-d (e.g., a selection of a third close-up image 524c, as shown) and/or may commit to utilizing the selected image 524c (e.g., for automatic discrete object identification and/or damage analysis) by selecting the choose close-up photo button 520-15 after a highlighting of or focus on the selected image 524c. In some embodiments, the user may choose to edit the selected image 524c (e.g., zoom-in, zoom-out, crop, cut a portion) by activation of the edit photo button 520-12.

Figure 5E:
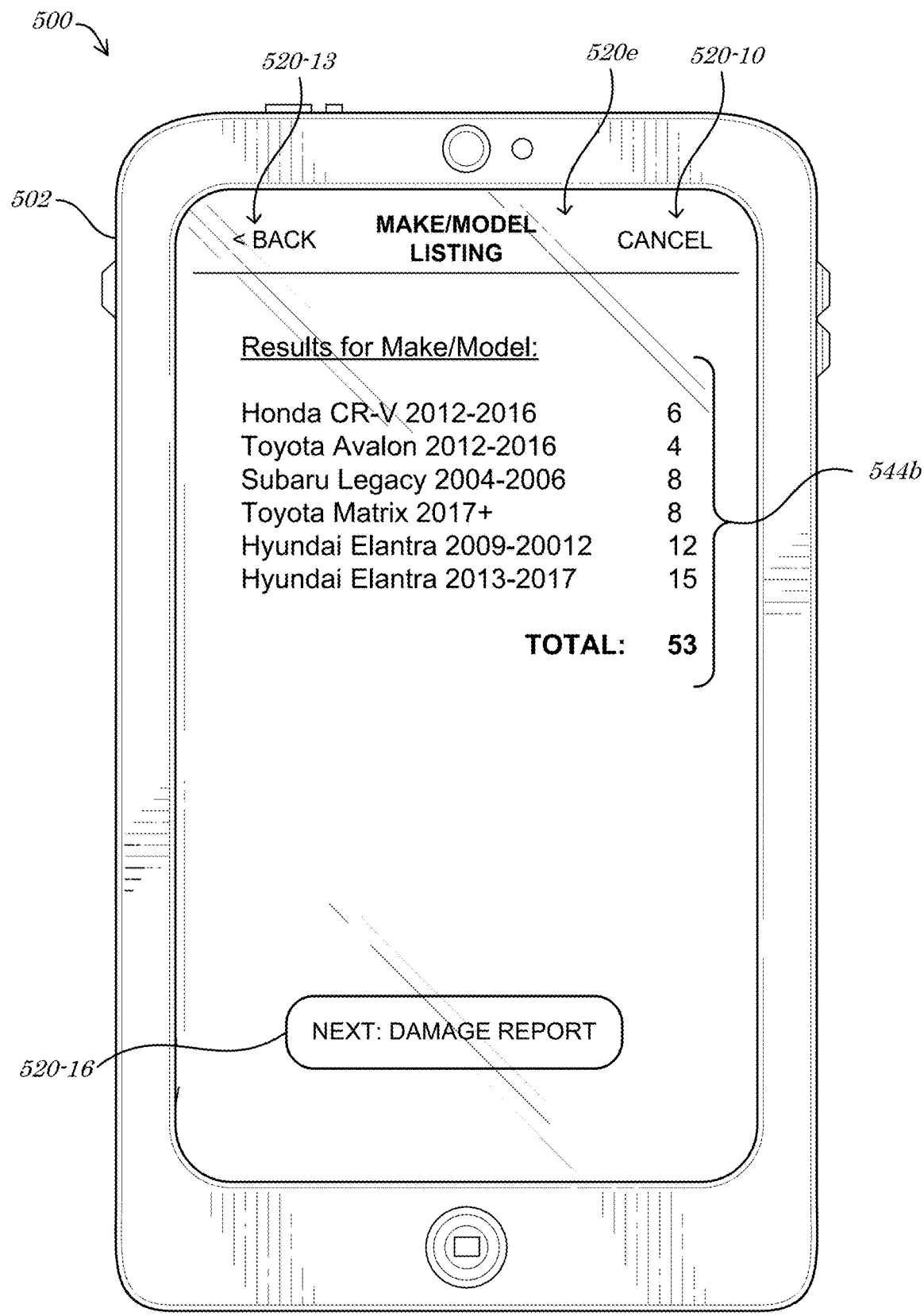
Figure 5F:
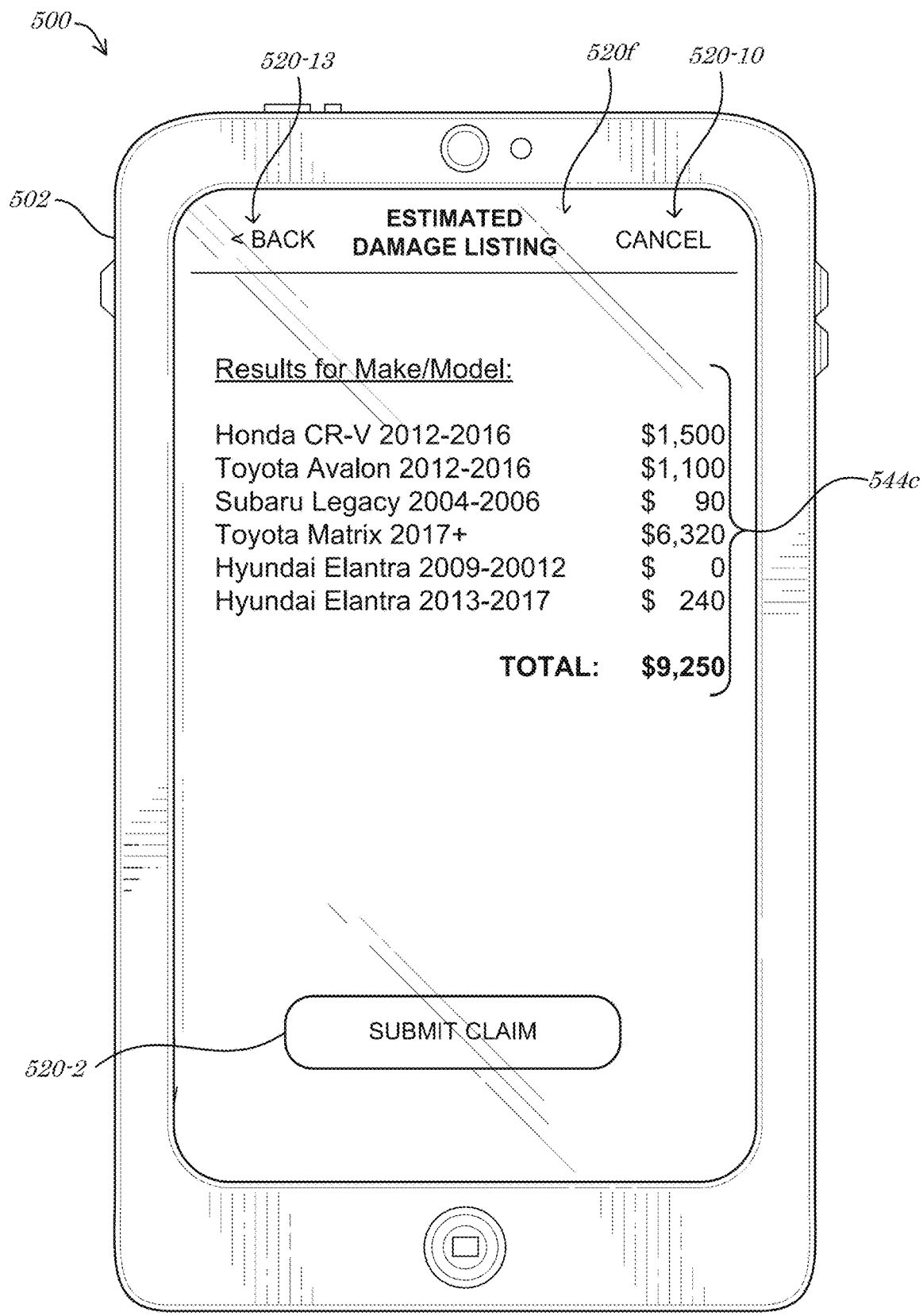

According to some embodiments, the choose close-up photo button 520-15 of the fourth version of the interface 520d may, for example, upon a triggering and/or receipt of input from the user (e.g., a properly-positioned click of a mouse or other pointer) with respect to the choose close-up photo button 520-15, initiate a sub-routine that causes an analysis of the selected close-up image 524c (e.g., an analysis by a second and/or third AI module operable to identify a type of each discrete object in the selected image 524c, identify damage to any discrete objects, and/or estimate a repair cost for any identified damage). In some embodiments, a triggering of the analysis and/or of the choose close-up photo button 520-15 may cause a fifth version (or page or instance) of the interface 520e to be output, e.g., as depicted in FIG. 5E. The fifth version of the interface 520e may comprise, for example, a discrete object identification interface (e.g., defining a fifth input and/or output mechanism) by providing the cancel button 520-10, the "back" button 520-13, and/or a "next: damage report" button 520-16. The back button 520-13 may be utilized, for example, to revert back to a previous screen, such as the fourth version of the interface 520d. In some embodiments, the fifth version of the interface 520e may display a result of the second AI module processing, such as a total number of discrete objects by type/grouping 544b. According to some embodiments, the user may continue processing by selecting the "next: damage report" button 520-16, which may trigger a provision of a sixth version (or page or instance) of the interface 520f, e.g., as depicted in FIG. 5F.

In some embodiments, the sixth version (or page or instance) of the interface 520f may comprise an estimated damage interface (e.g., defining a sixth input and/or output mechanism) by providing the cancel button 520-10, the "back" button 520-13, and/or the submit claim button 520-2. The back button 520-13 may be utilized, for example, to revert back to a previous screen, such as the fifth version of the interface 520e. In some embodiments, the sixth version of the interface 520f may display a result of the third (e.g., damage identification) and/or fourth (e.g., damage cost estimation) AI module processing, such as a total amount of estimated damage (e.g., a monetary amount) for the discrete objects at the target location. According to some embodiments, the user may continue by selecting the submit claim button 520-2, which may forward the calculated total (and/or itemized) damage estimates to an insurance claim handling system (not shown). In some embodiments, the user may go back (e.g., utilizing the back button 520-13) to edit any input and/or derived data (e.g., capture and/or select different imagery, adjust discrete object boundaries, locations, and/or identification or grouping information, etc.) to re-calculate the total estimated damage amount for the location.

While various components of the interface 520a-f have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. Automated Multi-Object Damage Analysis Apparatus and Articles of Manufacture

Figure 6:
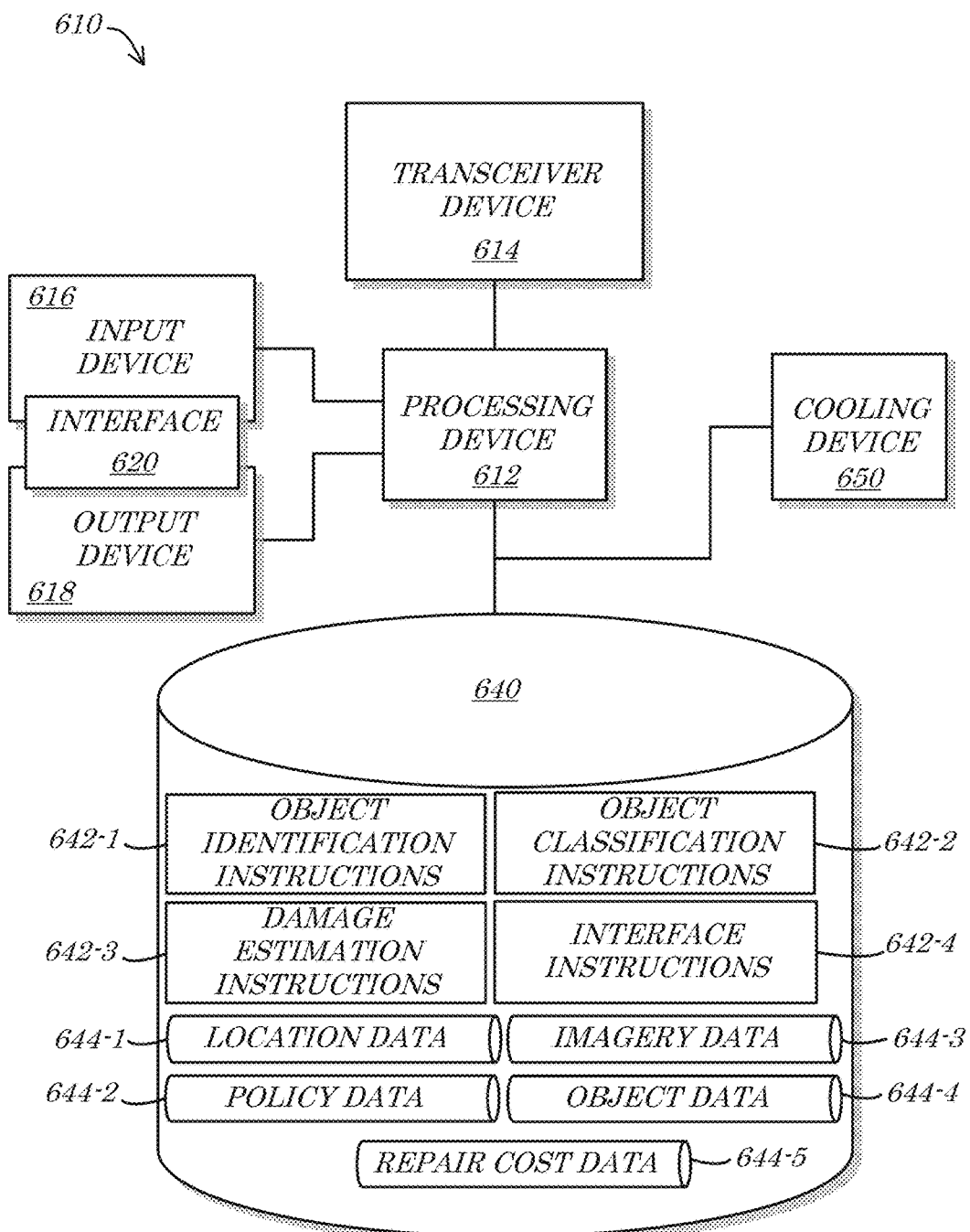
FIG. 6 is a block diagram of an apparatus according to some embodiments.
Figure 7A:
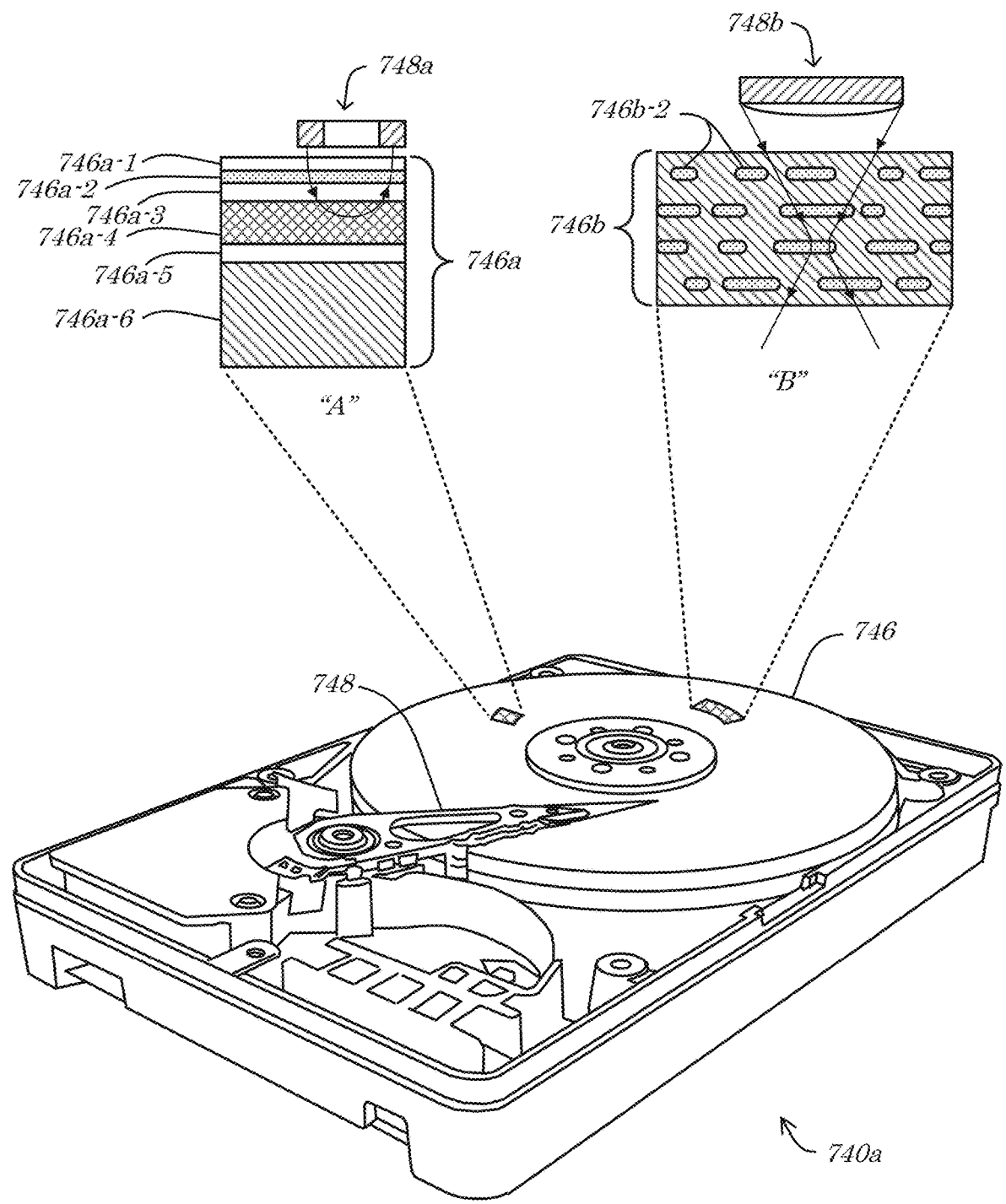
FIG. 7A, FIG. 7B, FIG. 7C, FIG. 7D, and FIG. 7E are perspective diagrams of exemplary data storage devices according to some embodiments.
Figure 7B:
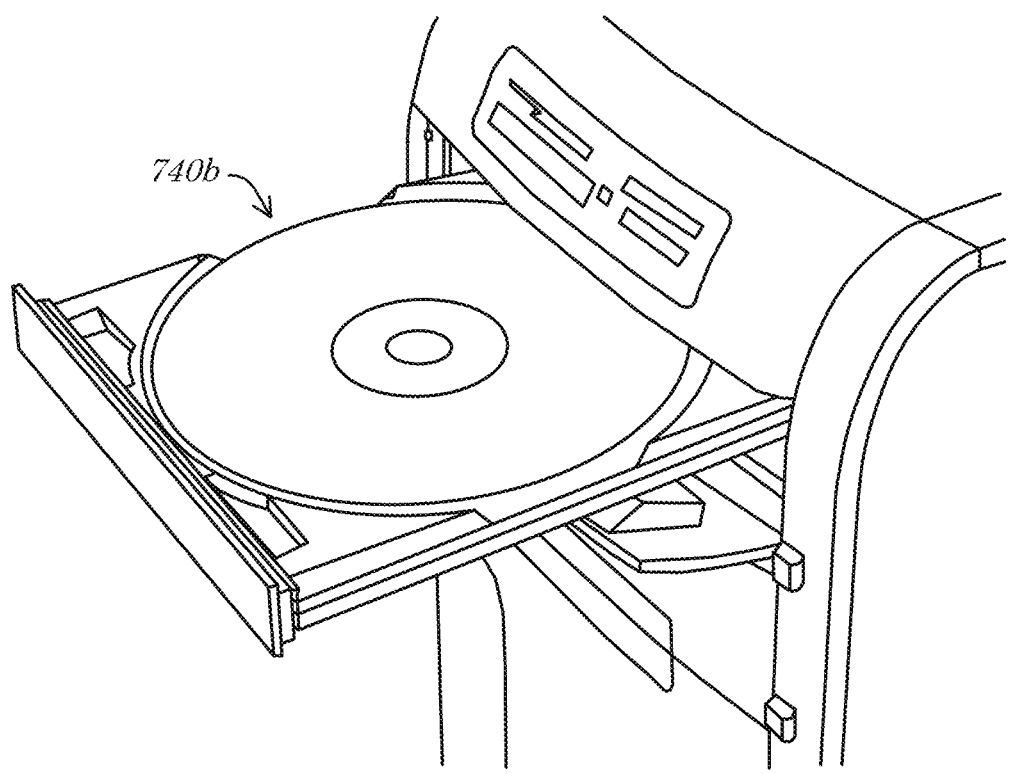
Figure 7C:
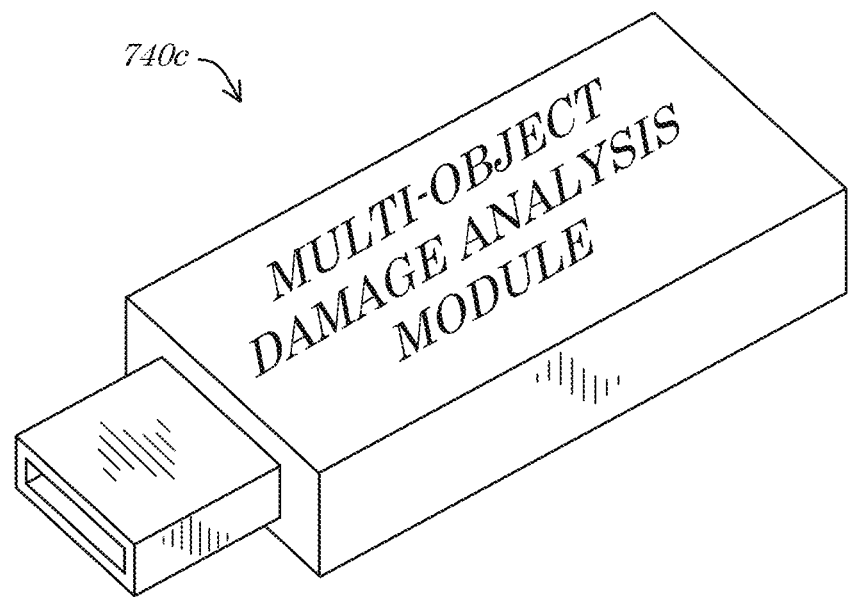
Figure 7D:
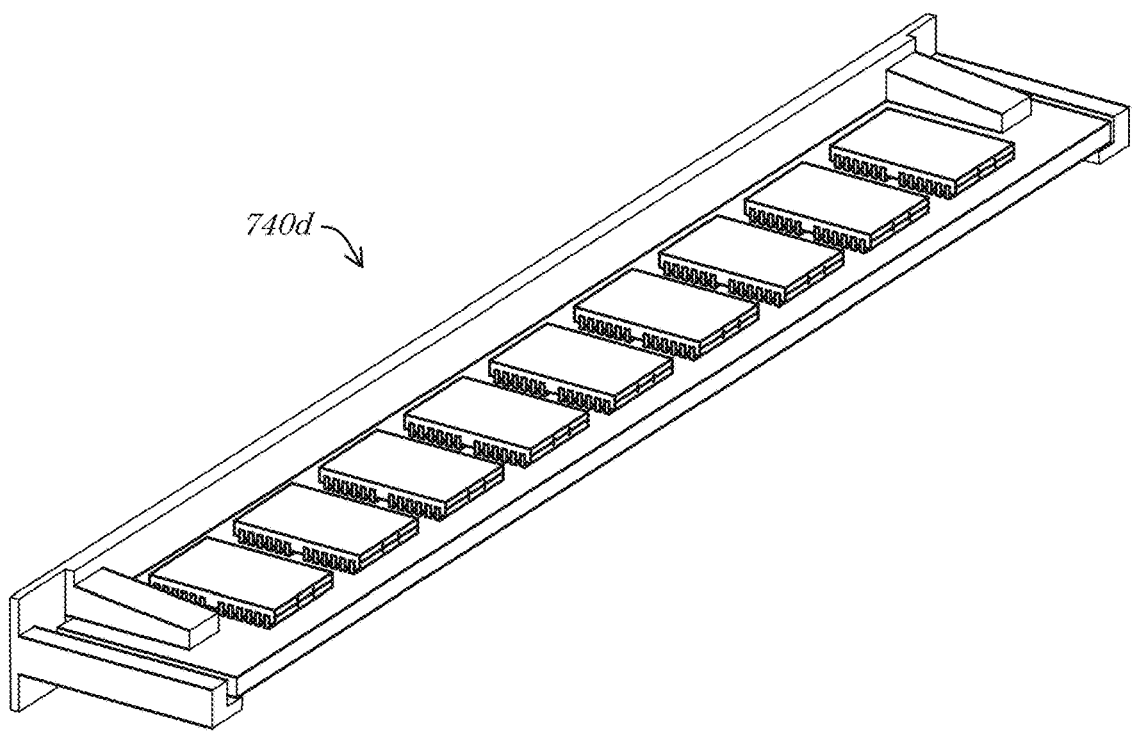
Figure 7E:
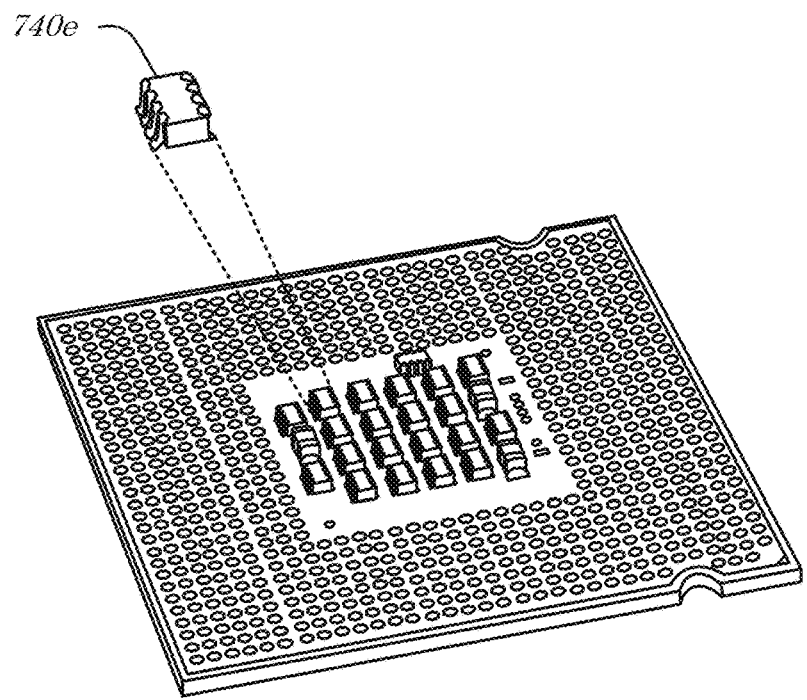

Turning to FIG. 6, a block diagram of an apparatus 610 according to some embodiments is shown. In some embodiments, the apparatus 610 may be similar in configuration and/or functionality to any of the server device/server 110, 210, the controller device 310, and/or the user/mobile electronic devices 102, 202, 502 of FIG. 1, FIG. 2, FIG. 3, and/or FIG. 5 herein. The apparatus 610 may, for example, execute, process, facilitate, and/or otherwise be associated with the method 400 of FIG. 4 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, and/or Uninterruptible Power Supply (UPS) device.

In some embodiments, the transceiver device 614 may comprise any type or configuration of electronic communication device that is or becomes known or practicable. The transceiver device 614 may, for example, comprise a Network Interface Card (NIC), a telephonic device, a cellular network device, a router, a hub, a modem, and/or a communications port or cable. In some embodiments, the transceiver device 614 may be coupled to transmit commands to one or more aerial vehicles (not shown) and/or receive imagery of a location for which insurance claims analysis of possible damage to a plurality of objects is desired. The transceiver device 614 may, for example, comprise a BLE, Wi-Fi®, and/or RF receiver device that acquires transmitted imagery data and/or a transmitter device that provides such data to a remote server (not shown), e.g., for analysis. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (such as an aerial vehicle and/or remote user device, not shown in FIG. 6).

In some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by an insurance customer and/or agent). In some embodiments, the input device 616 may comprise a sensor, such as a receiver, a camera, a proximity sensor, a vehicle device status sensor, a signal strength meter, etc. The output device 618 may, according to some embodiments, comprise a display screen and/or other practicable output component and/or device. The output device 618 may, for example, provide the interface 620 (such as the interfaces 220, 520a-f of FIG. 2, FIG. 5A, FIG. 5B, FIG. 5C, FIG. 5D, FIG. 5E, and/or FIG. 5F herein) via which automatic multi-object damage detection, verification, and/or analysis functionality are provided to a user (e.g., via a website and/or mobile application). According to some embodiments, the input device 616 and/or the output device 618 may comprise and/or be embodied in a single device such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of object identification instructions 642-1, object classification instructions 642-2, damage estimation instructions 642-3, interface instructions 642-4, location data 644-1, policy data 644-2, imagery data 644-3, object data 644-4, and/or repair cost data 644-5. In some embodiments, the object identification instructions 642-1, object classification instructions 642-2, damage estimation instructions 642-3, interface instructions 642-4 may be utilized by the processor 612 to provide output information via the output device 618 and/or the transceiver device 614.

According to some embodiments, the object identification instructions 642-1 may be operable to cause the processor 612 to process the location data 644-1, policy data 644-2, imagery data 644-3, object data 644-4, and/or repair cost data 644-5 in accordance with embodiments as described herein. Location data 644-1, policy data 644-2, imagery data 644-3, object data 644-4, and/or repair cost data 644-5 received via the input device 616 and/or the transceiver device 614 may, for example, be analyzed, sorted, filtered, decoded, decompressed, ranked, scored, plotted, and/or otherwise processed by the processor 612 in accordance with the object identification instructions 642-1. In some embodiments, location data 644-1, policy data 644-2, imagery data 644-3, object data 644-4, and/or repair cost data 644-5 may be fed by the processor 612 through one or more mathematical and/or statistical formulas and/or models in accordance with the object identification instructions 642-1 to conduct imagery analysis to identify and/or location a plurality of discrete objects at a target location, as described herein.

In some embodiments, the object classification instructions 642-2 may be operable to cause the processor 612 to process the location data 644-1, policy data 644-2, imagery data 644-3, object data 644-4, and/or repair cost data 644-5 in accordance with embodiments as described herein. Location data 644-1, policy data 644-2, imagery data 644-3, object data 644-4, and/or repair cost data 644-5 received via the input device 616 and/or the transceiver device 614 may, for example, be analyzed, sorted, filtered, decoded, decompressed, ranked, scored, plotted, and/or otherwise processed by the processor 612 in accordance with the object classification instructions 642-2. In some embodiments, location data 644-1, policy data 644-2, imagery data 644-3, object data 644-4, and/or repair cost data 644-5 may be fed by the processor 612 through one or more mathematical and/or statistical formulas and/or models in accordance with the object classification instructions 642-2 to identify a type, category, and/or grouping for each identified discrete object at the target location, as described herein.

According to some embodiments, the damage estimation instructions 642-3 may be operable to cause the processor 612 to process the location data 644-1, policy data 644-2, imagery data 644-3, object data 644-4, and/or repair cost data 644-5 in accordance with embodiments as described herein. Location data 644-1, policy data 644-2, imagery data 644-3, object data 644-4, and/or repair cost data 644-5 received via the input device 616 and/or the transceiver device 614 may, for example, be analyzed, sorted, filtered, decoded, decompressed, ranked, scored, plotted, and/or otherwise processed by the processor 612 in accordance with the damage estimation instructions 642-3. In some embodiments, location data 644-1, policy data 644-2, imagery data 644-3, object data 644-4, and/or repair cost data 644-5 may be fed by the processor 612 through one or more mathematical and/or statistical formulas and/or models in accordance with the damage estimation instructions 642-3 to identify areas of visible damage to one or more of the discrete objects identified at the location, calculate an estimated amount of damage to the one or more of the discrete objects identified at the location, calculate a total amount of estimated damage (e.g., in dollars) for the location (e.g., a summation of damage estimates for all discrete objects at the location), and/or calculate an amount payable in response to an insurance claim submission (e.g., compute a determination as to whether, or how much, of an insurance claim for the location should be paid), as described herein.

In some embodiments, the interface instructions 642-4 may be operable to cause the processor 612 to process the location data 644-1, policy data 644-2, imagery data 644-3, object data 644-4, and/or repair cost data 644-5 in accordance with embodiments as described herein. Location data 644-1, policy data 644-2, imagery data 644-3, object data 644-4, and/or repair cost data 644-5 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, location data 644-1, policy data 644-2, imagery data 644-3, object data 644-4, and/or repair cost data 644-5 may be fed by the processor 612 through one or more mathematical and/or statistical formulas and/or models in accordance with the interface instructions 642-4 to provide the interface 620 (e.g., such as the interface 220, 520a-f of FIG. 2, FIG. 5A, FIG. 5B, FIG. 5C, FIG. 5D, FIG. 5E, and/or FIG. 5F herein) via which input and/or output descriptive of a damage/loss event, location, object, scene, response action, and/or result may be captured and/or provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data, such as the object identification instructions 642-1, object classification instructions 642-2, damage estimation instructions 642-3, interface instructions 642-4, location data 644-1, policy data 644-2, imagery data 644-3, object data 644-4, and/or repair cost data 644-5, each of which is presented in reference to FIG. 6 herein. In some embodiments, instructions stored on the data storage devices 740a-e may, when executed by a processor, cause the implementation of and/or facilitate the method 400 of FIG. 4 herein, and/or portions thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

VI. Terms and Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with an "AI module" or a "module". As used herein, the term "module" may generally refer to a combination of specially-coded instructions stored on a non-transitory data storage medium and executed by a specific set of hardware and/or firmware components comprising at least one electronic processing device in communication with the non-transitory data storage medium. In some embodiments, components of a module may be mutually exclusive. According to some embodiments, components may be shared and/or replicated amongst different modules (e.g., a single processing unit may execute multiple sets of specially-programmed instructions stored on one or more non-transitory data storage medium instances). An "AI module" may comprise a type of module that includes machine-learning instructions directed to performing one or more particular tasks. In some embodiments, an AI module may comprise a set of specially-programmed instructions that are coded to interact by accepting at least one input, processing the input in accordance with one or more stored rules, providing at least one output based on an application of the one or more stored rules to the at least one input, and adjusting the one or more stored rules (or a subset thereof) based on the at least one output.

As utilized herein, the term "plurality of objects" may, in some embodiments, include a "large number of discrete objects" or "large number" of objects. The terms "large number of discrete objects" or "large number" of objects in reference to a number of discrete objects (e.g., vehicles) at a location (and/or identified in imagery of a location) may generally be descriptive of more than twenty (20) objects. In some embodiments, the large number of discrete objects may be descriptive of more than one hundred (100) objects.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a PDA, a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

VII. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for automatically ascertaining an estimated amount of damage to a plurality of objects at a location, comprising:
  an aerial vehicle comprising (i) a propulsion device, (ii) a wireless receiver device, and (iii) an imaging device; and
  a mobile device application executed on a mobile electronic device, wherein the mobile electronic device comprises (i) an electronic processing unit, (ii) a wireless transceiver device in communication with the electronic processing unit and the wireless receiver device of the aerial vehicle, and (iii) a non-transitory memory device in communication with the electronic processing unit, wherein the non-transitory memory device stores instructions that define the mobile device application and wherein the mobile device application, when executed by the electronic processing unit, results in:

transmitting, from the mobile electronic device and to the aerial vehicle, a command to capture bird's-eye view imagery of a location at which a plurality of objects have been reported as being damaged;

activating, by the aerial vehicle and in response to a receiving of the transmitted command to capture the bird's-eye view imagery of the location at which the plurality of objects have been reported as being damaged, the propulsion device and thereby positioning the aerial vehicle at a first altitude above the location at which the plurality of objects fit within a field of view of the imaging device;

capturing, by the imaging device of the aerial vehicle and from the first altitude above the location, the bird's-eye view imagery of the plurality of objects at the location;

analyzing, by a first artificial intelligence module, the bird's-eye view imagery of the plurality of objects at the location;

identifying, by the first artificial intelligence module and based on the analyzing of the bird's-eye view imagery of the plurality of objects at the location, a number of discrete objects in the bird's-eye view imagery;

transmitting, from the mobile electronic device and to the aerial vehicle, a command to capture a plurality of low-altitude imagery samples of the location, with each low-altitude imagery sample being directed at a subset of the number of discrete objects identified in the bird's-eye view imagery;

activating, by the aerial vehicle and in response to a receiving of the transmitted command to capture the plurality of low-altitude imagery samples at the location, the propulsion device and thereby repositioning the aerial vehicle at a second altitude above the location and orienting the imaging device such that a first subset of the number of discrete objects identified in the bird's-eye view imagery fit within a field of view of the imaging device;

capturing, by the imaging device of the aerial vehicle and from the second altitude above the location, the plurality of low-altitude imagery samples of the location, with each low-altitude imagery sample being directed at a subset of the number of discrete objects identified in the bird's-eye view imagery;

analyzing, by a second artificial intelligence module, the plurality of low-altitude imagery samples of the location;

identifying, by the second artificial intelligence module and based on the analyzing of the plurality of low-altitude imagery samples of the location, identification information for each of the discrete objects in the bird's-eye view imagery;

analyzing, by a third artificial intelligence module, the identification information for each of the discrete objects in the bird's-eye view imagery and damage information for the location;

calculating, by the third artificial intelligence module and based on the analyzing of the identification information for each of the discrete objects in the bird's-eye view imagery and the damage information for the location, a total dollar amount of estimated damage for the location; and outputting an indication of the calculated total dollar amount of estimated damage for the location.

2. The system of claim 1, wherein the transmitting of the command to capture the bird's-eye view imagery of the location at which the plurality of objects have been reported as being damaged, comprises:
identifying a geo-spatial coordinate of the location; and
transmitting the geo-spatial coordinate of the location to the aerial vehicle.

3. The system of claim 2, wherein the geo-spatial coordinate of the location comprises a plurality of coordinates defining a geo-spatial polygon.

4. The system of claim 1, wherein the positioning of the aerial vehicle at the first altitude above the location at which the plurality of objects fit within the field of view of the imaging device, comprises:
positioning the aerial vehicle at a geo-spatial coordinate of the location;
initiating an ascent of the aerial vehicle by increasing the altitude of the aerial vehicle;
monitoring bird's-eye imagery from the imaging device during the ascent;
identifying, based on the monitoring, a boundary of the location within the field of view of the imaging device; and
stopping, in response to the identifying, the ascent.

5. The system of claim 1, wherein the mobile device application, when executed by the electronic processing unit, further results in:
identifying, by the first artificial intelligence module and based on the analyzing of the bird's-eye view imagery of the plurality of objects at the location, a geo-spatial coordinate of each of the discrete objects in the bird's-eye view imagery.

6. The system of claim 5, wherein the repositioning of the aerial vehicle at a second altitude above the location and orienting the imaging device such that a first subset of the number of discrete objects identified in the bird's-eye view imagery fit within a field of view of the imaging device, comprises:
positioning the aerial vehicle at a first identified geo-spatial coordinate of a first one of the discrete objects at the location;
directing the imaging device toward the first one of the discrete objects at the location;
initiating a geo-spatial translation of the aerial vehicle by adjusting the geo-spatial location of the aerial vehicle;
monitoring imagery from the imaging device during the geo-spatial translation;
identifying, based on the monitoring, a boundary of the first subset of the number of discrete objects within the field of view of the imaging device; and
stopping, in response to the identifying, the geo-spatial translation.

7. The system of claim 1, wherein the identifying of the identification information for each of the discrete objects in the bird's-eye view imagery comprises utilizing optical character recognition to acquire alphanumeric data from the plurality of low-altitude imagery samples.

8. The system of claim 7, wherein the alphanumeric data comprises one or more of (i) a license plate number, (ii) a VIN, (iii) a vehicle manufacturer logo, (iv) a vehicle model identifier, (v) a part number, and (vi) a barcode.

9. The system of claim 1, wherein the identifying of the identification information for each of the discrete objects in the bird's-eye view imagery comprises utilizing optical shape recognition to acquire shape data from the plurality of low-altitude imagery samples.

10. The system of claim 9, wherein the shape data comprises one or more of (i) taillight or headlight shape data, (ii) window shape data, (iii) bumper shape data, (iv) vehicle body shape data, (v) door shape data, and (vi) side-mirror shape data.

11. The system of claim 1, wherein the mobile device application, when executed by the electronic processing unit, further results in:
analyzing, by a fourth artificial intelligence module, at least one of the bird's-eye view imagery and the plurality of low-altitude imagery samples; and
identifying, by the fourth artificial intelligence module and based on the analyzing of the at least one of the bird's-eye view imagery and the plurality of low-altitude imagery samples, damage information for the location.

12. The system of claim 11, wherein the damage information for the location comprises at least one of an indicator of a type of damage and an indicator of an extent of damage, for each of the discrete objects in the bird's-eye view imagery.

13. The system of claim 12, wherein the identification information for each of the discrete objects in the bird's-eye view imagery comprises a make and model of a vehicle and wherein the calculating of the total dollar amount of estimated damage for the location, comprises:
querying, for each of the discrete objects in the bird's-eye view imagery, a database storing information relating (i) vehicle make and model information, (ii) type of damage information, (iii) extent of damage information, and (iv) estimated dollar amount of damage information; and
calculating, by summing the estimated dollar amount of damage information for each of the discrete objects in the bird's-eye view imagery, the total dollar amount of estimated damage for the location.

14. The system of claim 1, wherein the outputting of the indication of the calculated total dollar amount of estimated damage for the location, comprises:
transmitting, to a remote server device of an insurance company claim processing system, the indication of the calculated total dollar amount of estimated damage for the location.

15. The system of claim 1, wherein the indication of the calculated total dollar amount of estimated damage for the location is output via a display device of the mobile electronic device.

16. The system of claim 1, wherein at least one of the analyzing by the first artificial intelligence module, the analyzing by the second artificial intelligence module, and the analyzing by the third artificial intelligence module, comprises:
transmitting, from the mobile electronic device and to a remote server device, a request for an activation of at least one of the first, second, and third artificial intelligence modules.

17. The system of claim 16, further comprising:
the remote server device.

18. The system of claim 1, further comprising:
the mobile electronic device.

* * * * *